United States Patent [19]
Flohr et al.

[11] Patent Number: 5,534,914
[45] Date of Patent: Jul. 9, 1996

[54] VIDEOCONFERENCING SYSTEM

[75] Inventors: Daniel P. Flohr, Wilmington, N.C.; Stuart Ross, Danbury, Conn.

[73] Assignee: Target Technologies, Inc., Wilmington, N.C.

[21] Appl. No.: 310,732

[22] Filed: Sep. 22, 1994

Related U.S. Application Data

[60] Division of Ser. No. 199,377, Feb. 18, 1994, Pat. No. 5,374,952, which is a continuation-in-part of Ser. No. 72,201, Jun. 3, 1993, abandoned.

[51] Int. Cl.$^6$ ............................ H04N 7/14; H04M 11/00
[52] U.S. Cl. .............................. 348/15; 348/14; 379/93; 379/202
[58] Field of Search .................................. 379/93, 94, 96, 379/201, 202; 348/6, 7, 8, 9, 10, 11, 12, 13, 14, 15, 16, 17, 18, 19; 370/62; 455/4.1, 5.1, 6.1; H04N 7/14

[56] References Cited

U.S. PATENT DOCUMENTS

| | | | |
|---|---|---|---|
| 4,564,940 | 1/1986 | Yahata | 370/124 |
| 4,675,866 | 6/1987 | Takumi et al. | 370/124 |
| 4,686,698 | 8/1987 | Tompkins et al. | 348/15 |
| 4,710,917 | 12/1987 | Tompkins et al. | 370/62 |
| 4,716,585 | 12/1987 | Tompkins et al. | 379/202 |
| 4,814,869 | 3/1989 | Oliver, Jr. | 358/108 |
| 4,847,829 | 7/1989 | Tompkins et al. | 370/62 |
| 4,885,747 | 12/1989 | Foglia | 370/123 |
| 4,893,326 | 1/1990 | Duran et al. | 348/14 |
| 4,935,924 | 6/1990 | Baxter | 370/73 |
| 4,977,449 | 12/1990 | Morgan | 348/6 |
| 5,014,267 | 5/1991 | Tompkins et al. | 370/62 |
| 5,341,374 | 8/1994 | Lewen et al. | 379/202 |

FOREIGN PATENT DOCUMENTS

| | | |
|---|---|---|
| 0119588 | 9/1984 | European Pat. Off. |
| 0488289 | 6/1992 | European Pat. Off. |
| 0535890 | 4/1993 | European Pat. Off. |
| 2590429 | 5/1987 | France |
| WO94/24803 | 10/1994 | WIPO ................................. 348/15 |

OTHER PUBLICATIONS

"Video-und Datenkommunikation im VBN" by Pernsteiner et al., *NTZ Nachrichten–technische Zeitschrift* (vol. 42, No. 8, Aug. 1989) pp. 486–493.

IBM Technical Disclosure Bulletin, vol. 34, No. 7A, Dec. 1991, Armonk, NY, pp. 375–377, "Interactive Computer Conference Server".

Data Communications International, vol. 19, No. 7, Jun. 1990, New York, NY, pp. 85–92, Fischer et al., "Taking a Second Look at Videoconferencing".

Data Communications International, vol. 20, No. 10, Aug. 1991, New York, NY, pp. 43–47, Johnson, "Video and LANS: A Question of Balance".

(List continued on next page.)

*Primary Examiner*—Jason Chan
*Attorney, Agent, or Firm*—Furgang & Milde

[57] ABSTRACT

A videoconferencing network for digital computer workstations that operate on a local area network (LAN) to exchange data. The network includes a signalling local area network (A-LAN), connected to a first port of a plurality of workstations, for transmitting and receiving data signals between selected ones of the workstations and a broadband local area network (B-LAN) connected to a second port of the plurality of workstations, for transmitting and receiving television signals between selected ones of these workstations. Each television signal is transmitted at a selected frequency channel so that no two transmissions interfere. A software program, stored in and operable on the computer of each workstation, generates and receives data messages, transmitted via the A-LAN, to and from the computer of another workstation, respectively. These data messages initiate and control the transmission of the television signals on the B-LAN such that a plurality of television signals are transmitted simultaneously on the B-LAN, with each television signal assigned to a separate frequency channel. The software program in each computer monitors the status of the channel allocations and generates the channel selecting control signals.

9 Claims, 26 Drawing Sheets

OTHER PUBLICATIONS

NTT REVIEW, vol. 4, Jul. 1992, Tokyo, JP, pp. 81–85, Masaki et al., "A Desktop Teleconferencing Terminal Based on B-ISDN: PMTC".

Computer, Vo. 24, No. 10, Oct. 1991, Los Alamitos, CA, pp. 69–79, Vin etal. "Multimedia Conferencing in the Etherphone Environment".

IEEE INFOCOM '91, vol. 3, Apr. 7, 1991, Bal Harbour, FL, pp. 1127–1144, XP000223440, Tanigawa et al., "Personal Multimedia–Multipoint Teleconference System".

SCRAMBLED VIDEO

VIDEOCONFERENCING SYSTEM

CROSS-REFERENCE TO RELATED APPLICATION

This is a division, of application Ser. No. 08/199,377, filed Feb. 18, 1994, now U.S. Pat. No. 5,374,952 which is a CIP of U.S. patent application Ser. No. 08/072,201, filed Jun. 3, 1993, now abandoned.

BACKGROUND OF THE INVENTION

The present invention relates, generally, to a network or system for transmitting both data and television signals between a plurality of digital computer ("PC") workstations and/or "stand-alone" stations. More particularly, the invention relates to two-way multimedia communications in a local area network (LAN) environment.

Multimedia communications concern the transfer of digital data along with video and/or audio information. Multimedia applications software is available that permits digital computer workstations, particularly desktop personal computers or "PCs", to access multimedia program sources. One-way multimedia communications are particularly well-known in instructional programs.

Live two-way multimedia communications, generally referred to as "videoconferencing", have heretofore required a major investment, involving a dedicated room, expensive single-purpose hardware and specially-trained operators. Less ponderous conferencing hardware, conferencing hardware that is more user-friendly, preferably including multiple-use components, is needed.

As multimedia applications are incorporated into digital computer ("PC") workstations it becomes possible to use such workstations for videoconferencing with the users of one or more similar workstations at either nearby or remote locations. To achieve this capability, such a workstation must include, as a minimum:

(1) an image display (e.g., CRT display);

(2) a sound transducer (e.g., loudspeaker);

(3) a digital computer for processing data, connected to supply image and control signals to the digital display for imaging data;

(4) a circuit for converting the video portion of a television signal into image and control signals compatible with the image display for displaying a picture on this imaging device; and (5) an analog amplifier or the like which provides the proper gain and impedance for driving the sound transducer with the audio portion of the TV signal.

A conversion circuit of the aforementioned type, which digitizes an analog video signal and formats this digitized signal in such a way as to permit display of the video image on a digital computer display, is well known. Such a circuit, called a "video window controller", is available for both the DOS-based Personal Computer and the PS/2 computer of International Business Machines Corp., as well as for the Macintosh computers of Apple Computer Corp. This circuit is used to view standard recorded video, such as VCR program material, or to view live images from a standard video camera, on the monitor screens of the workstations.

If two-way communication with a digital computer workstation is desired, it is necessary also to provide the workstation with a video camera, aimed appropriately at the workstation user, for producing a video signal representing the image of the workstation user, and a microphone arranged to pick up the voice of the workstation user and to generate an analog audio signal in response thereto.

If computer circuitry for controlling an image display is not present, a display can be driven by another circuit, called a "video display processor", which converts video signals into the standard or protocol required to operate the display. Such circuits are conventionally employed in the art of video games.

The term "information signal", as used herein, is intended to mean any signal, analog or digital, which conveys information such as data or graphics. An "information signal" may thus include a "data signal" and/or a "television signal", depending upon the type of information transmitted, and/or some other kind of information signal.

The term "television signal" or "TV signal", as used herein, is intended to mean a conventional (NTSC or other standard) analog signal, which includes both a video and an audio portion, and/or any other standard or non-standard representation of video and/or audio information including digitally encoded information (compressed or uncompressed). The terms "video signal" and "audio signal" will be used to separately denote only the video portion and audio portion, respectively, of the television signal. As is well known, for NTSC standards, the video portion lies within a frequency range of 0 to 4.75 MHz whereas the audio portion lies within a frequency band of 0 to 15 KHz. As desired, these video and audio signals are typically combined and modulated upward from baseband to a 6 MHz wide (in Europe, a 7 MHz wide) frequency channel within a broadband spectrum of 30 to 800 MHz.

Similarly, broadband (30–800 MHz) television signals containing one or more active frequency channels can be tuned and demodulated to produce the video and audio portions (signals) of a single television signal at baseband.

As used herein, the term "baseband signals" is intended to define information signals within the frequency range of 0 to 30 MHz, or perhaps 0 to 50 MHz. Computer data is normally transmitted over a network by baseband signals. The term "broadband signals" is thus intended to mean information signals at a frequency higher than the highest baseband frequency—typically in the frequency range of 40 to 600 MHz. If the upper limit of the baseband range terminates at a lower frequency, for example, 25 MHz, the lower limit of the broadband range can commence at this lower frequency. The highest broadband frequency is determined only by the limitations of the transmission technology (e.g. CATV cable) and the applicable government standards, if any.

It is known in the television industry to transmit the audio portion of a television signal—i.e., the "audio signal"—with frequency modulation (FM) on a carrier at 4½ MHz. Among television industry standards, only the French standard SECAM transmits sound with amplitude modulation (AM). The video portion of the television signal ("video signal") with most TV standards is transmitted in AM with a given polarity.

It is known to transmit both baseband and broadband signals on a common "backbone communication network" such as a local area network (LAN) which is connected to a plurality of user workstations. The U.S. Pat. No. 4,885,747 to Foglia discloses a so-called "filter coupler" or "F-coupler" by which (1) baseband signals (data) are transmitted between a backbone network and a given workstation via a twisted pair shielded cable in a balanced mode, and (2) broadband (television) signals are transmitted between the same backbone network and the same workstation via the same shielded cable in an unbalanced mode. The disclosure of this U.S. patent is incorporated herein by reference. A coupler which enables the transmission of both baseband and broadband signals on a LAN twisted pair cable is termed a "video coupler" or "V-coupler"

With the Foglia system, a number of television programs (satellite television, VCR or a "live" broadcast from a television camera) is "broadcast" to all workstations connected to the LAN (an IBM Token Ring, in this case) from a coaxial video cable through a so-called "tap/combiner". While each workstation can select one from a number of television channels that are broadcast on the broadband frequencies, and while it is even possible for a workstation to broadcast to all other workstations by means of a TV camera or some other program source, it is not possible for any particular workstation to transmit television signals to any other particular workstation or workstations on the LAN, or to transmit to any remote workstation not connected to the LAN, thereby to provide true videoconferencing capability.

The U.S. Pat. No. 4,564,940 to Yahata discloses a so-called "broadband network system" which includes a private branch exchange (PBX) for interconnecting a plurality of workstations. However, this system is intended to replace an industry standard local area network (LAN) for the multiplex communication of voice and data. No consideration is given to the special problems encountered by the transmission of television signals.

The U.S. Pat. No. 4,675,866 to Takumi et al. discloses a transmission system between workstations that provides both a baseband and broadband capability. One or more channels in the broadband network are used for effecting transmission of signals of the baseband network. A central re-transmission facility serves to provide videotext to a plurality of workstations. No videoconferencing capability is contemplated or disclosed.

The U.S. Pat. No. 4,814,869 to Oliver, Jr. discloses a "video surveillance system" in which modulated signals from a plurality of video cameras are multiplexed onto a single path capable of carrying, for example, up to 36 video channels. One or more such communication paths are provided to a signal splitter which provides the paths to one or more video screens and tuners. The tuners are operated under control of a computer so as to sequence the display of information from the different video cameras onto the video screens.

The U.S. Pat. No. 4,977,449 to Morgan discloses a similar video surveillance system in which both the modulators at the video cameras and the demodulators at the monitors are "frequency agile". In this case, the control computer controls the channel selection of both the modulators and the demodulators. In both the Oliver Jr. and Morgan patents, however, no videoconferencing capability is contemplated or disclosed.

The U.S. Pat. No. 4,935,924 to Baxter discloses a signal distribution cable network in which information signals from different signal sources, such as cable television, FM radio, videotape recorder, video camera and compact disk player, are transmitted on a common cable at different frequency channels. A single channel allocation "controller" is connected on the cable and transmits channel selection signals on the cable to both the information sources and the information users (receivers) to control the channel allocation. Again, no videoconferencing capability is contemplated or disclosed.

The U.S. Pat. Nos. 4,686,698; 4,710,917; 4,716,585; 4,847,829 and 5,014,267 of Tompkins et al. disclose a videoconferencing network in which a plurality of video terminals are connected in a star configuration to a "MIX" switching network. The MIX switching network operates in the manner of a "telephone switch" to connect one of the video terminals to one or more of the other video terminals. Each cable connecting a video terminal to the MIX carries baseband frequencies and two channels above baseband for the two-way transmission of audio and video information. MIX switches can be interconnected but terminals can only be interconnected via one or more MIX switches.

The French Patent No. 2,590,429 discloses a video terminal having both a camera and an image display. Broadband television signals are received on one cable and transmitted on another, in digital form. Time division multiplexing is used to transmit plural signals. As in Tompkins et al., the video terminals are arranged in a star configuration.

The article "Video-und Datenkommunikation im VBN" by Pernsteiner et al., *NTZ Nachrichtentechnische Zeitschrift* (Vol. 42, No. 8, August 1989) pp. 486–493 discloses a "video workstation" (that is, a PC workstation adapted to transmit and receive both video and audio) which is connected to a glass fiber communication network established by the German Telephone and Postal Authority (Bundespost) known as the "Preliminary Broadband Network" (VBN). It is contemplated that each video workstation be either coupled directly to the VBN, or coupled thereto via a "mega-switch". In the latter instance, the video workstations are connected to the mega-switch in a star configuration.

The European Patent Publication No. 0,119,588 discloses an "integrated information system" in which a videoconferencing station (so-called "BIGFON Island") sends digitized video, audio and data signals via an optical fiber transmission cable to a video/telephone switching network. All of the video stations are connected to this telephone switch in a star configuration.

Similarly, the article "Software Architecture for Integration of Video Services in the Etherphone System" by Rangan et al., *IEEE Journal on Selected Areas in Communication*, Vol. 9, No. 9, December 1991, pp. 1395–1404 discloses a videoconferencing system having a plurality of videoconferencing workstations all connected in a star configuration to a matrix switch. The matrix switch is controlled by a computer called a "central connection manager".

All of these known videoconferencing systems are relatively complex, require a dedicated computer for controlling the interconnection of video workstations and/or the selection of transmission channels on a multichannel cable. As a consequence, these systems are relatively expensive to implement on a per/workstation basis.

SUMMARY OF THE INVENTION

A principal object of the present invention, therefore, is to provide a videoconferencing network for digital computer ("PC") workstations and/or other "stand-alone" stations which enables each workstation and/or station to enter into a videoconference with any other selected workstation and/or station without the intervention of a central control computer or the provision of a central switch analogous to a telephone exchange.

Another principal object of the present invention is to provide a multimedia communications facility for a digital computer workstation which enables the workstation to participate flexibly in multimedia exchanges with media terminals on a network.

It is a further object of the present invention to provide full-motion, 30 frames per second, and high resolution videoconferencing between and among a plurality of PC workstations or stand-alone stations, without degradation as the number of simultaneous videoconferences taking place on the network increases.

It is a further object of the present invention to provide a videoconferencing system of the type just described at a minimal cost per station.

It is a further object of the present invention to provide videoconferencing capability among a plurality of workstations which are all connected on a common LAN.

It is a further object of the present invention to provide a videoconferencing capability among a plurality of workstations which are not connected together on a LAN.

It is a further object of the present invention to enable a plurality of workstations to conduct videoconferences between selected workstations even though the videoconferencing workstations are located within different "work groups" of a LAN or on different networks.

It is a further object of the present invention to enable one or more of a plurality of workstations at a local site to conduct a videoconference with a workstation or videoconferencing site at a remote location.

It is a further object of the present invention to provide a videoconferencing system for digital computer workstations and/or stand-alone stations which is secure against the unauthorized monitoring of videoconferences by the connection of a conventional television set, or the like, to the system.

It is a further object of the present invention to enable any one of a plurality of digital computer workstations to selectively obtain television programming from any one of a plurality of programming sources.

It is a further object of the present invention to provide a stand-alone videoconferencing "telephone" station having a dedicated digital computer as a control element.

These objects, as well as other objects which will become apparent from the discussion that follows, are achieved, by providing a videoconferencing network for a digital computer ("PC") workstation and/or a "stand-alone" station wherein each station is connected on (1) a signalling local area network (A-LAN) for transmitting and receiving data signals between the stations and (2) a broadband local area network (B-LAN) for transmitting and receiving television signals between the stations. Each television signal is transmitted at a selected frequency channel within the broadband spectrum, in any standard or custom signal format. In addition, a software program, stored in and operable on the internal computer of each station, generates and receives data messages transmitted via the A-LAN to and from the computers of other stations, respectively, which initiate and control the transmission of the television signals on the B-LAN. A plurality of television signals can thus be transmitted simultaneously on the B-LAN, with each signal assigned to a separate frequency channel. The software program in each computer monitors the status of the channel allocations and generates channel selecting control signals for the modulator and demodulator at the respective station.

With this network arrangement, every station in the system can be a transmitter, and every station can be a receiver. Multiple stations can act as transmitters and receivers simultaneously with the television signals being transmitted on different channels.

The B-LAN can be implemented by providing an RF or CATV cable which interconnects all computer stations in the network. Alternatively, the aforementioned V-coupler (or equivalent) can be provided so that the broadband television information can be transmitted over the same physical communication layer as the baseband data. Hereinafter this physical layer, which can be a shielded or unshielded twisted pair wire, for example, will be designated as the "LAN cable".

According to a another feature of the present invention, the data messages which control the transmission and receipt of television signals are transmitted over either a conventional local area network, at baseband frequencies, or via a dedicated frequency channel on the broadband network. In either case, these "signalling messages" are transmitted separately from the television signals on the so-called "A-LAN".

According to another particular feature of the present invention, the television signals may be transmitted to or received from the outside world, for example using the ISDN digital network service.

According to another feature of the present invention, individual work groups (for example, work groups on each floor of a building) of a local area network may be coupled together via "bridges" for transmission of television signals from one work group to another.

According to another feature of the present invention, system security may be provided by the simple expedient of inverting the video signal that is transmitted on the B-LAN and/or utilizing a SECAM audio signal standard (i.e., AM) where SECAM is not normally used, and an NTSC audio signal standard (i.e., FM) where SECAM is used. Such simple security measures would prevent an unauthorized person from simply attaching a conventional television receiver to the B-LAN cable and tuning to the various frequency channels to extract confidential transmissions.

Alternatively, security may be provided by means of conventional CATV scrambling techniques or by other suitable circuits which will be described hereinbelow.

According to another feature of the present invention, a dedicated "video server" computer is coupled to the A-LAN and B-LAN to effect special software control of the system. For example, this video server may serve to combine the television signals on several channels to produce another television signal representing a composite image.

According to another feature of the present invention, audio messages and/or video frames may be stored at a workstation in digital form for subsequent playback or transmission.

According to further features of the invention, the software in each workstation can implement telephone style functions, such as "call waiting", "call forwarding", "answering machine", etc., and can control the access to features of the network, for example, in a "conference call" between more than two parties.

For a full understanding of the present invention, reference should now be made to the following detailed description of the preferred embodiment of the invention as illustrated in the accompanying drawings.

DESCRIPTION OF THE PREFERRED EMBODIMENTS

Figure 1:
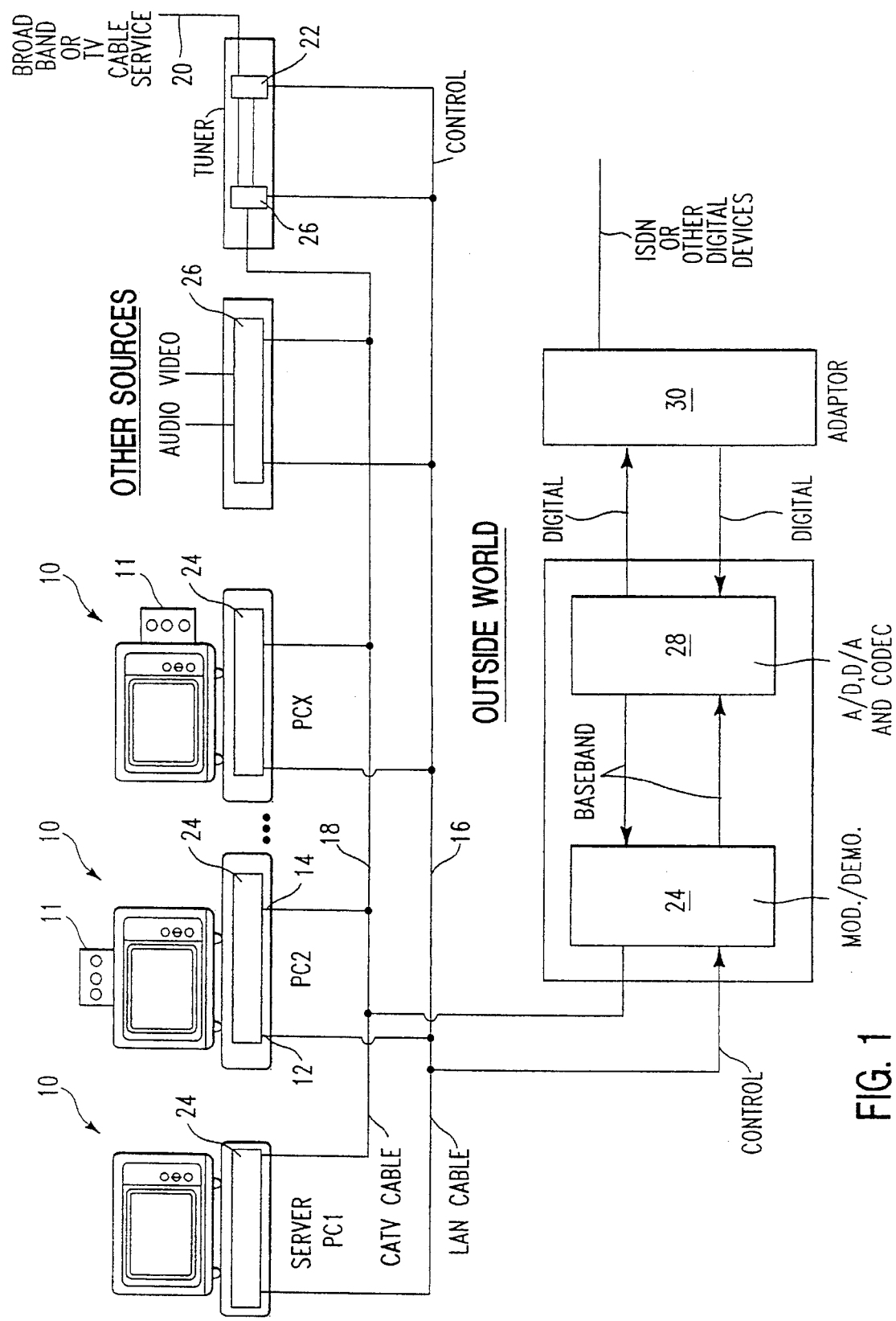
FIG. 1 is a block diagram of a preferred embodiment of the videoconferencing system, according to the present invention, comprising a plurality of PC workstations arranged on a common LAN.

The preferred embodiments of the present invention will now be described with reference to FIGS. 1–26 of the drawings. Identical elements shown in the various figures are identified with the same reference numerals.

FIG. 1 illustrates the data and television network according to the present invention. The system comprises a number of computer workstations PC 2 . . . PC X which will be described in detail below in connection with FIG. 2. Each PC workstation 10 has an attached unit 11 comprising a video camera, microphone and loudspeaker. Suffice it to say at this point that each computer workstation has a first input/output port 12 for transmitting and receiving data signals and a second input/output port 14 for transmitting and receiving television signals. These ports can be physically separate, or can be physically identical but connected to provide signals on different frequency channels on a common cable.

The system further includes a signalling (e.g., baseband) local area network (A-LAN) connected to the first port 12 of each workstation, for transmitting and receiving data signals between selected ones of these workstations. The A-LAN may comprise a separate LAN cable 16 such as a shielded twisted pair wire, a coaxial cable or other suitable waveguide.

A broadband local area network (B-LAN) is connected to the second port 14 of each workstation for transmitting and receiving television signals between selected ones of the workstations. The B-LAN network may comprise a standard co-axial CATV cable 18. As will be further explained below, the broadband television signals can also be transmitted on the LAN cable 16 with the aid of video couplers ("V-couplers"). The television signals are transmitted from one workstation to another at a selected frequency channel. Full duplex communication between two workstations—for example, between PC 2 and PC X—requires the use of two channels—for example, one for transmission from PC 2 to PC X and another for transmission from PC X to PC 2.

Each workstation, PC 2 . . . PC X, has stored therein a software program for generating and receiving data messages, transmitted via the A-LAN, to and from another workstation, respectively, for initiating and terminating a videoconference. The data messages initiate and control the transmission of the television signals on the B-LAN such that a number of television signals can be, and are transmitted simultaneously on the B-LAN with each television signal assigned to a separate frequency channel.

With the system so configured, each workstation is capable of being both a receiver and a transmitter of television signals simultaneously. The television signals are generated at baseband as a standard (e.g., NTSC) video signal and a separate audio signal. These signals are modulated into a 6 MHz wide signal and then placed into one of the sixty-four channels in the 50–475 MHz range. For example, the center frequency of the lowest channel may be set at 55.25 MHz.

If a European television standard is used, the baseband television signal may be either a SECAM or PAL color television standard which is modulated into a 7 MHz wide channel. In practice, the videoconferencing system according to the invention can support any recognized standard.

As shown further in FIG. 1, it is also possible to obtain television signals from other sources. For example, a television camera or video player may produce an NTSC video and audio signal which may be placed on the B-LAN, under control of the A-LAN, for receipt by any and all of the workstations. Alternatively, or in addition, a cable television signal received on a coaxial cable 20 may be demodulated into a video and audio signal for transmission on the B-LAN. The channel selected from among the many channels delivered by the cable 20 is controlled by data messages transmitted via the A-LAN cable 16 with a tuner and demodulator 22.

Whereas the video cable 18 is designed to serve the "B-LAN" or broadband local area network, one frequency channel of this cable may be dedicated to serve the "A-LAN" or baseband local area network. In this case, the LAN cable 16, which serves to transmit data and signalling messages between the workstations 10 may be eliminated. In this case, only one cable, namely the video cable 18, is needed to transmit the signalling information (A-LAN) and the broadband television information (B-LAN).

The television signals are modulated into the proper channel for transmission on the B-LAN, under control of data signalling messages received on the A-LAN, by an RF modulator within a television control circuit board 24 located at each workstation. This same circuit board contains a tuner and demodulator for receiving the television signal on a selected channel on the B-LAN and demodulating this signal into the separate baseband video and audio signals for displaying an image and producing sound at the respective workstation. If the particular unit is to serve only as a source, a separate circuit board 26 may be provided which does not contain the tuning and demodulating capability. Similarly, if the unit is to serve only as a receiver, the circuit board does not require a modulator.

For a connection to the "outside world" beyond the LAN, a modulating and demodulating circuit board 24 is required to convert to and from baseband video signals. The signals to be transmitted outward are digitized and compressed, and the signals received from beyond the LAN are decompressed and converted to analog video, in a conventional codec 28. The digital signals are transmitted and received on the telephone network via an adaptor 30 using a digital network service such as ISDN or the like.

It will be understood that the TV signals generated in the system may be either standard (e.g., NTSC) or non-standard (i.e., custom). This applies to the signals supplied to and received from the modulator/demondulator 24 on both the broadband side (i.e., the side of the CATV cable 18) and the baseband side. The modulator/demodulator 24 and the codec 28 are therefore designed accordingly to operate with the appropriate signal format.

Finally, with respect to FIG. 1, a "video server" PC 1 may be provided, if desired, to perform certain common functions which are not readily or efficiently implemented in each workstation PC 2- PC X, such as maintaining a current status table of the frequency channel allocations and/or combining television images transmitted on a plurality of channels into a composite image for transmission on still another channel.

Figure 2:
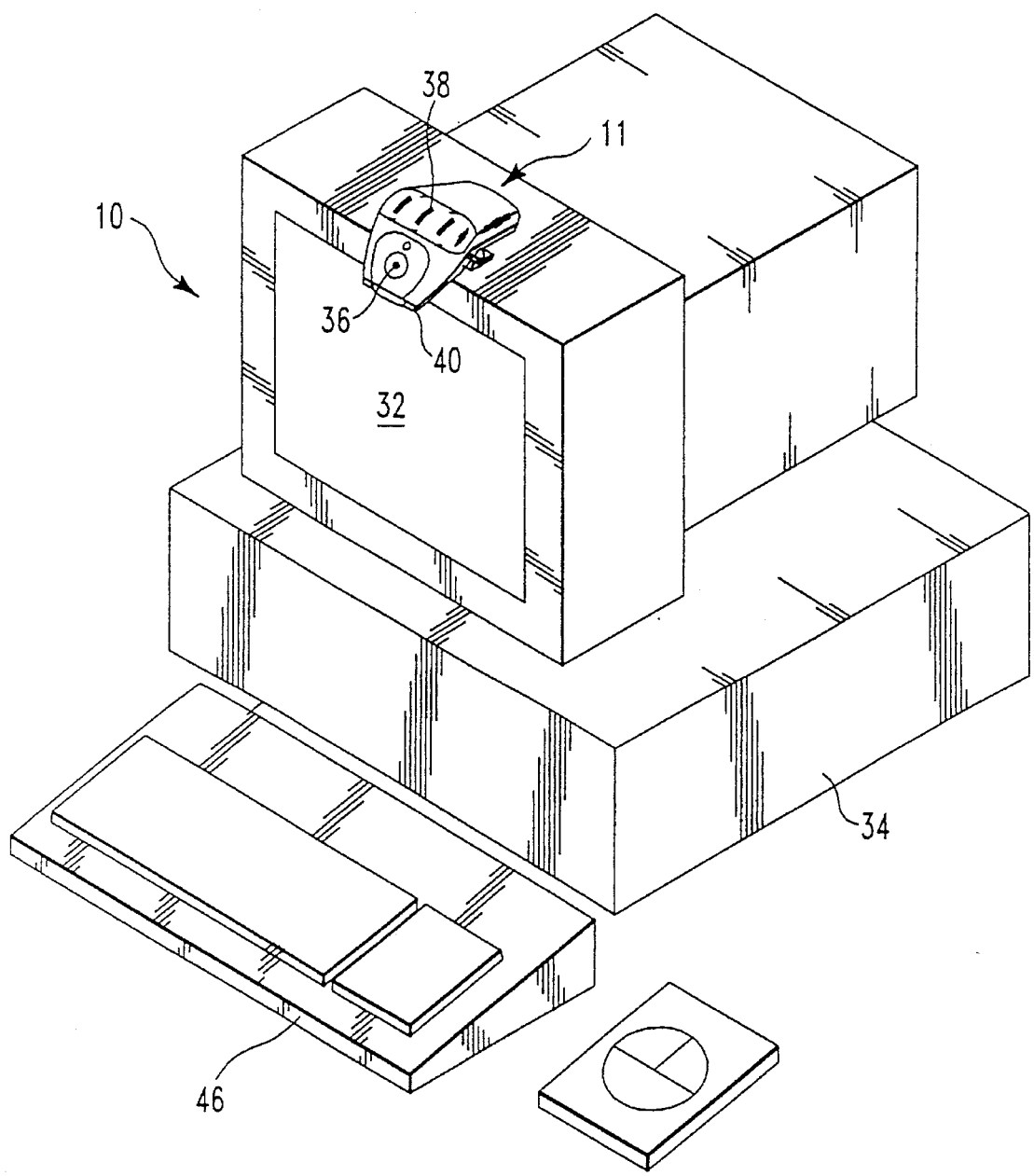
FIG. 2 is a representational, perspective view of a digital computer workstation of the type employed with the videoconferencing system according to the invention.

FIG. 2 illustrates a workstation 10 containing the essential elements required for practicing the present invention. This workstation comprises an image display 32, a digital computer for processing data 34 and a video camera unit 11 containing a built-in video camera 36, microphone 38 and loudspeaker 40. In addition, or in place of the microphone 38 and loudspeaker 40, a conventional telephone handset may be provided. Controls for audio volume and/or channel selection may also be arranged as desired.

The computer workstation is otherwise conventional and is provided with a keyboard 46, a "mouse" 47 and/or other input devices, such as a touch-screen, as desired.

Figure 3:
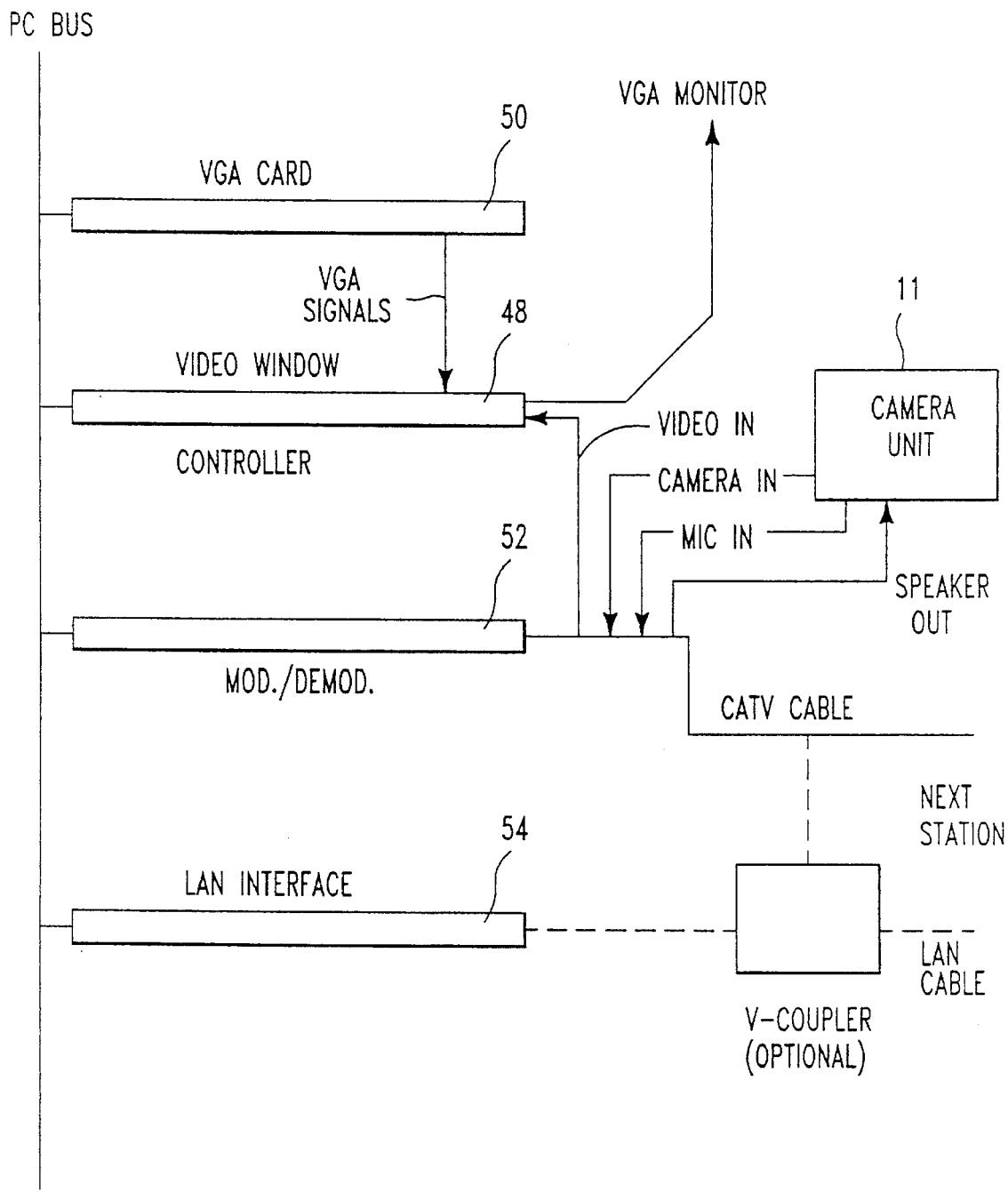
FIG. 3 is a block diagram showing a number of circuit boards employed in a workstation for implementation of the present invention.
Figure 4:
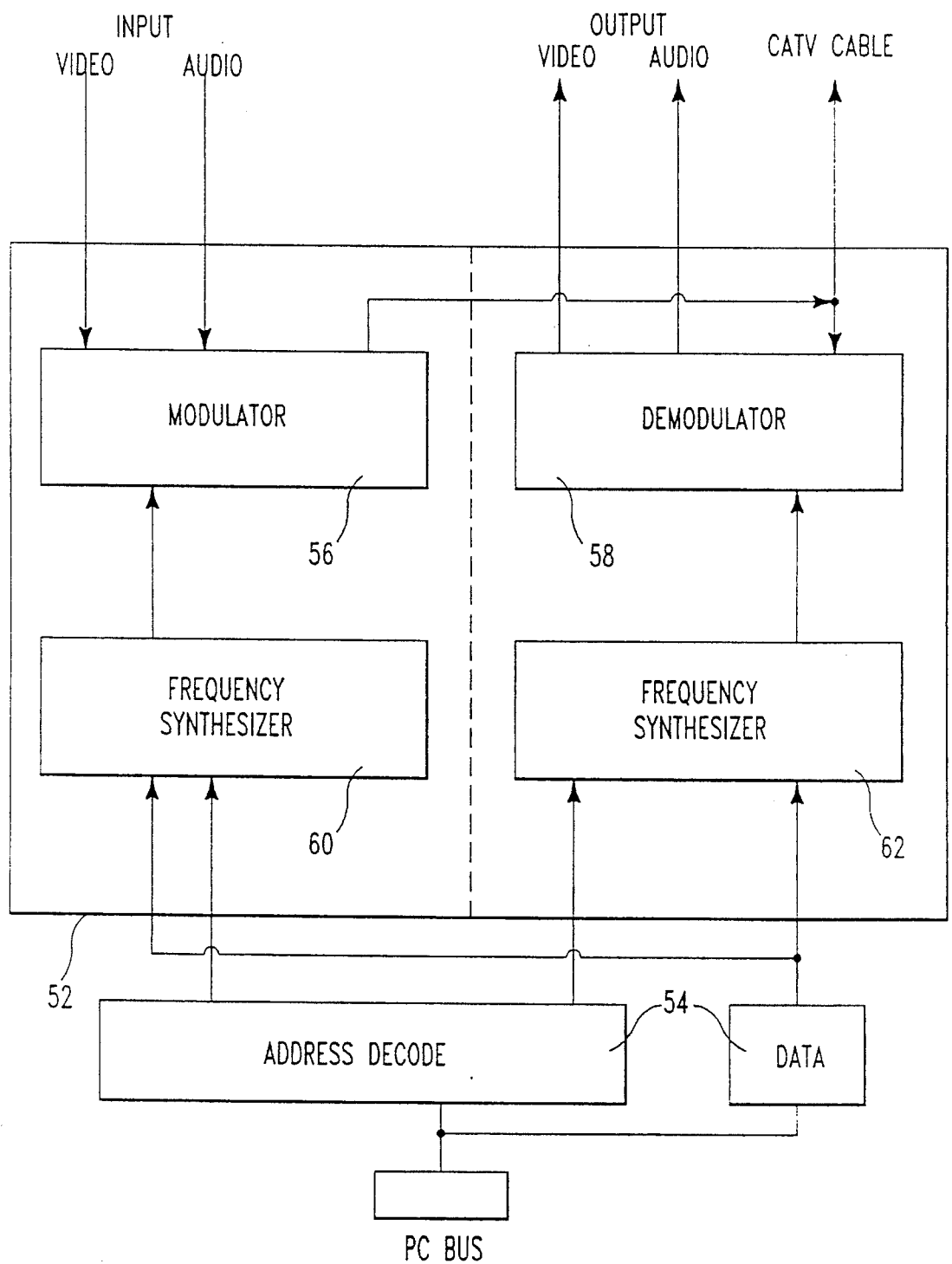
FIG. 4 is a block diagram which illustrates the operation of a workstation in the videoconferencing system.

FIGS. 3 and 4 illustrate conceptually the hardware contained in a PC workstation in accordance with the present invention. As shown in FIG. 3, the hardware comprises a video window controller 48 and a modulator/demodulator circuit board 52 in addition to the conventional videographics (VGA) card 50 and LAN interface board 54. The video window controller 48 converts the received NTSC-standard baseband video signal into red, green and blue analog signals which are supplied to the VGA monitor. It also receives data, timing and control signals from the VGA card for imaging data on the VGA monitor. Video camera, microphone and speaker signals are received from, and passed to, the PC camera unit 11.

As indicated in FIG. 3 by dashed lines, the video cable may be connected to the LAN cable via a video coupler or "V-coupler", if desired. With such an arrangement, it is unnecessary to provide a separate video cable connecting all the workstations together. In this case, the video signals are passed to the already existing LAN cable for transmission from one workstation to another.

The principal functions of the mod/demod board 52 will now be described with reference to FIG. 4. Control messages received via the A-LAN are decoded in the LAN board 54 and supplied to the mod/demod board 52 via the PC bus. As illustrated in FIG. 4, the board 52 comprises a modulator 56 and demodulator 58 under control of frequency synthesizers 60 and 62, respectively, which supply the channel frequency selected by the LAN board 54. The modulator receives baseband NTSC-standard video from the video camera at the workstation and audio from the microphone and converts these signals to a composite television signal at a selected frequency channel. This television signal is then supplied to the B-LAN broadband cable.

Similarly, the demodulator 58 receives television signals on various channels via the B-LAN cable and tunes and demodulates one channel into video and audio signals at baseband.

The channel frequencies required for operation of the modulator and demodulator are generated by frequency synthesizers 60 and 62. These synthesizers operate in response to an address decode and to channel selection data received via the PC bus through interface circuitry.

Figure 5A:
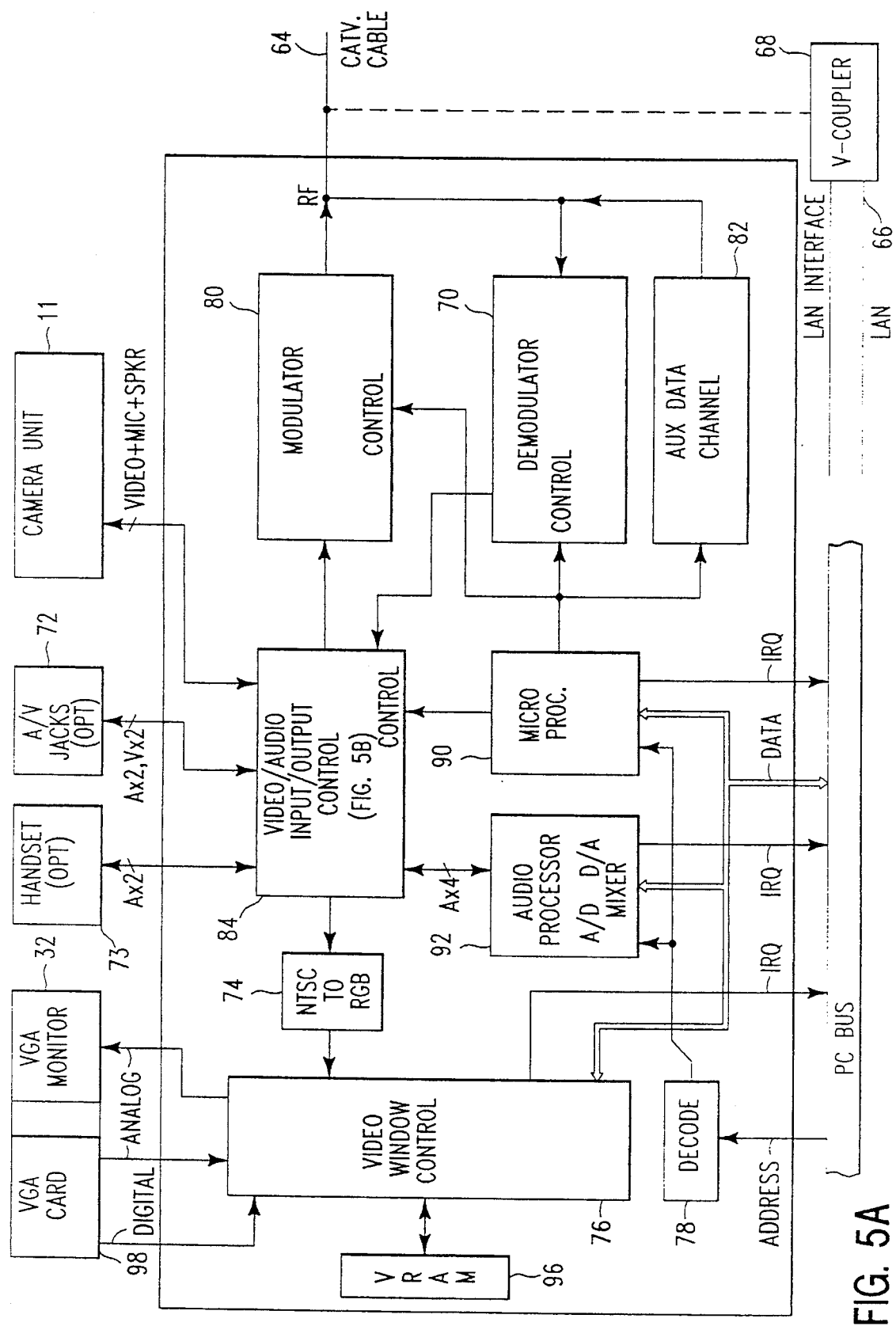
FIG. 5, comprised of FIGS. 5A and 5B, is a block diagram showing an actual implementation of a video window controller and modulator/demodulator circuit board according to a preferred embodiment of the present invention.
Figure 5B:
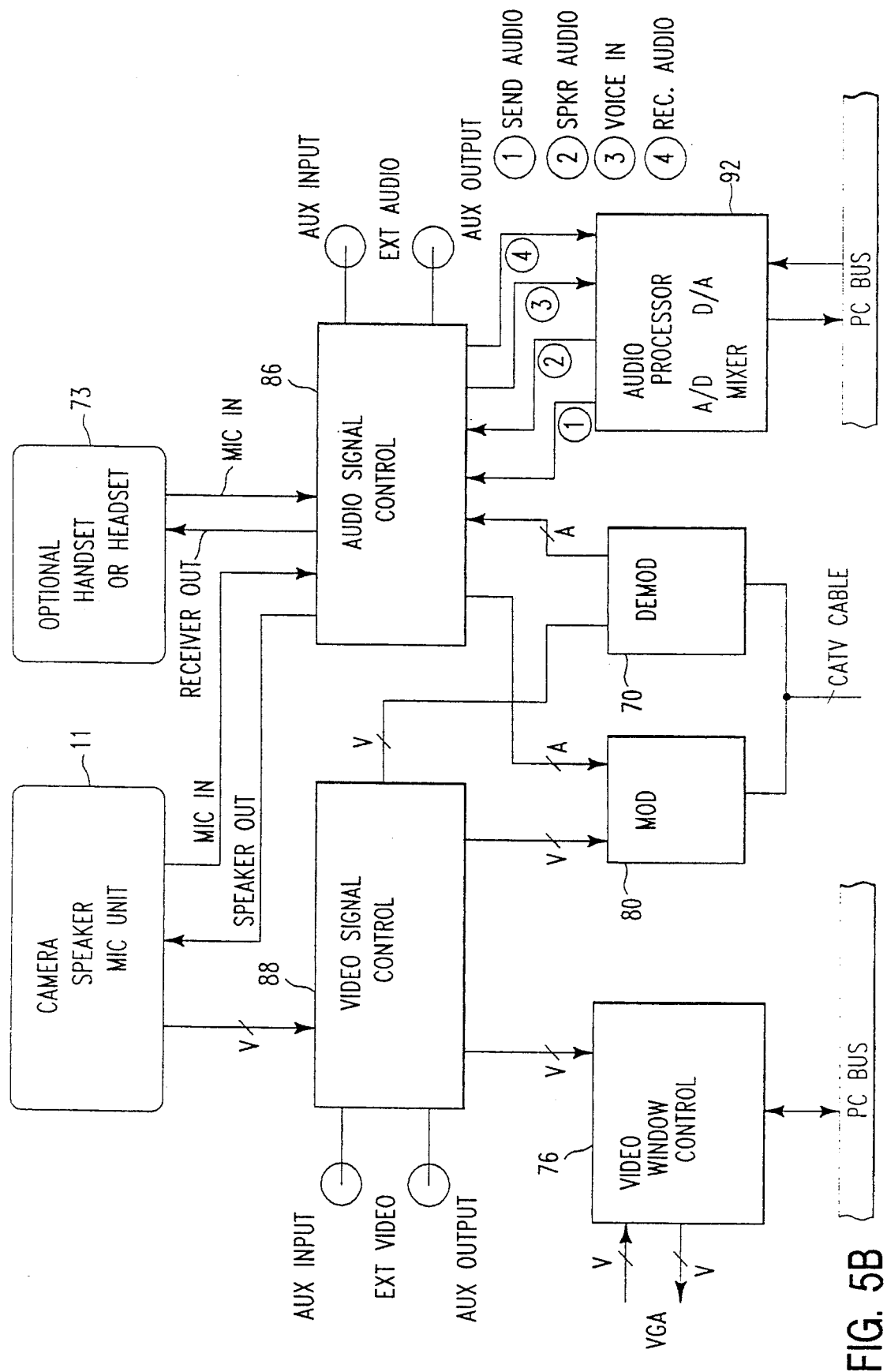

FIG. 5, comprised of FIGS. 5A and 5B, illustrates the video window controller and mod/demod (sections) in greater detail. As is shown in these diagrams also, the television signals may be transmitted on a separate video cable 64 or via the existing LAN cable 66 using a V-coupler 68.

Television signals received either via the RF network cable 64 or the LAN cable 66 and V-coupler 68 are passed to an RF demodulator 70 which is tuned to the desired channel by a control signal from a microprocessor 90. The baseband video signal is passed to a video/audio input/output control 84 (FIG. 5A), to an NTSC to red, green and blue converter 74 and then to a video window controller 76. The audio portion of the composite television signal is supplied through an audio signal control 86 (FIG. 5B) to an amplifier (not shown) which drives a speaker in the camera unit 11 or a telephone handset 73.

Conversely, the video signal received from the camera unit 11 is passed through a video signal control 88 (FIG. 5B) to an RF modulator 80. The audio signal received from a microphone in the camera unit is also passed through the audio signal control to the RF modulator 80. This audio signal may be sampled and digitized in an A/D converter in an audio processor 92 and then supplied to the PC for storage on a hard disk for subsequent retrieval and "playback". The retrieved digital signal is passed to a D/A converter in the processor 92 and then transmitted via the audio signal control 86 to the speaker or handset, or to the audio input of the modulator 80.

If desired, similar arrangements can be provided to store and retrieve one or more frames of video information, as is well known in the art.

The RF modulator 80 combines the video and analog signals into a 6 MHz wide baseband composite television signal and places this signal on a selected frequency channel for transmission via the RF network (video cable 64). The channel frequency is selected and supplied to the RF modulator by the microprocessor 90.

The microprocessor 90 receives control and data signals from the PC bus and an address decoder 78 and supplies interrupt requests (IRQ), data and address information to the PC bus to establish and eventually terminate videoconference transmissions with another workstation. The microprocessor 90 also supplies control signals to the video and audio signal controls 86 and 88 as well as to an auxiliary data channel modulator 82 for supplying signalling messages on a dedicated broadband (CATV) channel.

The video window controller 76 operates with a video memory or "VRAM" 96 to capture and display the incoming video signal and to supply the resulting windowed video signals to the monitor 32. The video window controller 76 receives synchronization and other signals from the VGA card 50.

Figure 6:
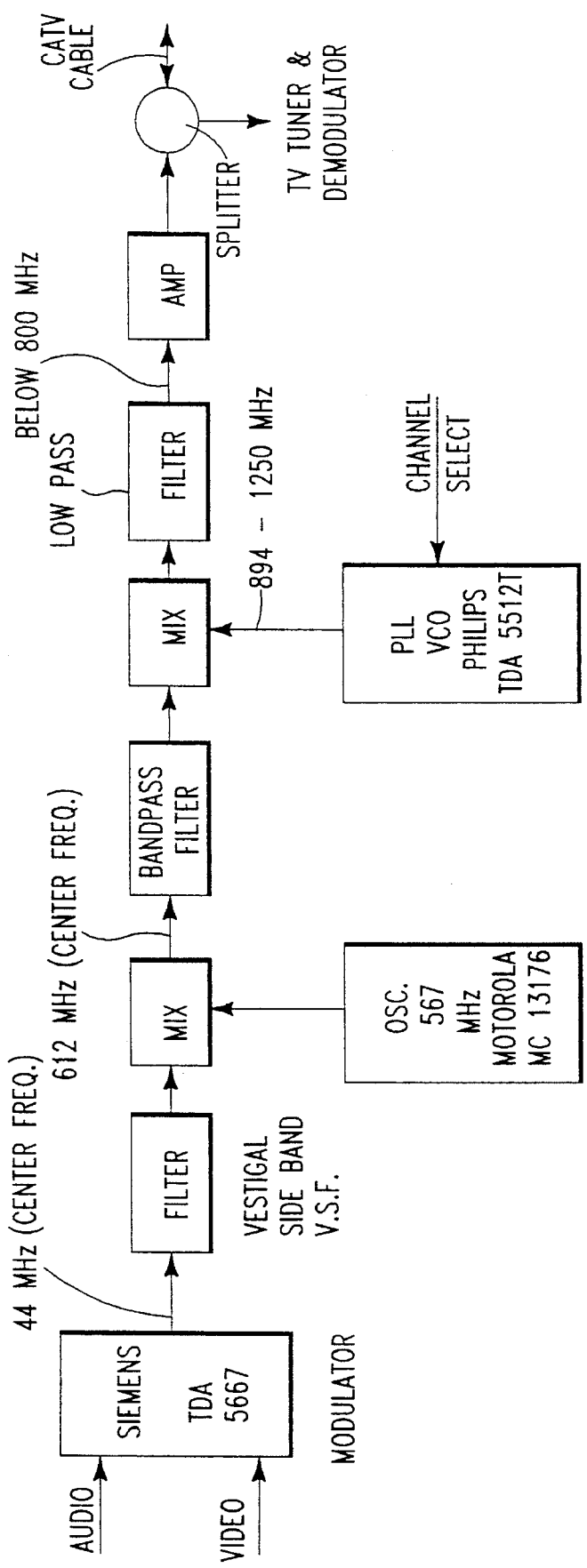
FIG. 6 is a block diagram of an RF modulator circuit according to the preferred embodiment of the present invention.
Figure 7:
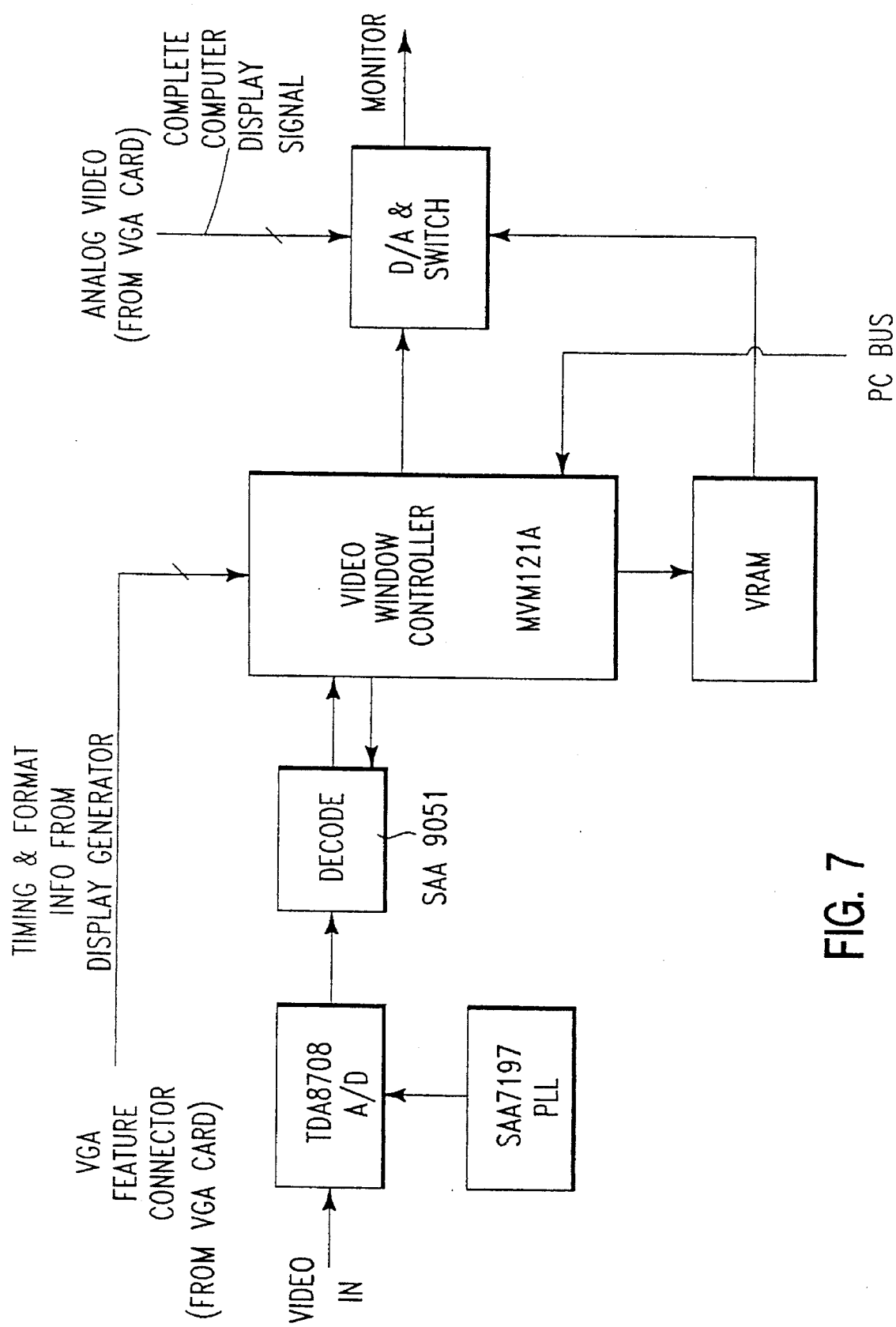
FIG. 7 is a block diagram of a video window controller circuit board according to the preferred embodiment of the present invention.

Details of the various portions of the circuit of FIG. 5 are illustrated in FIGS. 6 and 7. These circuits indicate standard logic elements and, in some cases, the actual integrated circuit chip designation. The microprocessor 90 is preferably a ZILOG Z-8 series microprocessor or an Intel 8051.

A preferred implementation of the RF modulator is shown in FIG. 6. A preferred embodiment of the video window controller is illustrated in FIG. 7. The integrated circuit chip part numbers used in these circuits, and their manufacturing sources, are set forth in the Table below:

TABLE

| Manufacturers | Integrated Circuits |
| --- | --- |
| Media Computer Technologies, Inc. 3160 De La Cruz Blvd. Santa Clara, CA 95054 | Part No. MVM 121A (PC Video) |
| Philips Semiconductors 2001 W. Blue Heron Blvd. P.O. Box 10330 Riveria Beach, FL 33404 | Part No. TDA 5512 T (synthesizer) Part No. TDA 8708 (analog to digital converter) Part No. SAA 9051 (digital multistandard decoder) Part No. SAA 7197 (phase locked loop) |
| Seimens Components, Inc. | Part No. TDA 5667 |

TABLE-continued

| Manufacturers | Integrated Circuits |
| --- | --- |
| Integrated Circuits Division 10950 North Tantau Avenue Cupertino, CA 95014 | (RF Modulator) Part No. SL 5770 (RF Modulator) |
| Motorola Corp. Phoenix, AR | Part No. MC 13176 (SAW stabilized oscillator) |

FIG. 6 shows in detail how the audio and video signals are placed on a selected frequency channel for transmission to another workstation. The RF modulator, which can be either a TDA 5667 or SL 5770 integrated circuit, places the audio and video signals on separate carriers, that is, a 45.75 MHz video carrier and a 41.25 MHz audio carrier. The center frequency of this channel is 44 MHz.

In order to provide security for the system, one or more of the following measures may be used: The audio signal may be transmitted with amplitude modulation (AM) rather than the standard frequency modulation (FM) normally used for NTSC television. This is accomplished simply by applying the audio signal at the proper input pin to the integrated circuit.

In addition, or alternatively, the video signal may be transmitted in inverted form. This is accomplished by simply grounding a pin on the integrated circuit.

In addition, or alternatively, conventional CATV scrambling techniques may be used. A particular scrambler will be described below in connection with FIG. 24.

The 44 MHz television signal is passed through a vestigial sideband filter that eliminates the lower sideband, and is then mixed with an 567 MHz signal to produce an 612 MHz (center frequency) television signal. The 567 MHz oscillator may be a commercially available SAW resonator such as the illustrated MC13176 circuit. This signal is passed through a bandpass filter. The resulting signal is then mixed with another high frequency signal of selected frequency in the range of 894–1250 MHz. The mixed signal is passed through a lowpass filter which passes signals below 800 MHz. The resulting signal, in the frequency range of 50 to 500 MHz, is supplied through an amplifier and/or a signal splitter to the video cable.

The circuit of FIG. 7 is substantially embodied in a video window controller integrated circuit: MVM 121A. The NTSC signal is digitized in an A/D converter, then decoded and supplied to the video window controller. The output of this integrated circuit is passed to the VGA monitor through a D/A converter and switch IC, as is well known in the art.

FIGS. 8–12 illustrate how the videoconferencing system according to the present invention may be expanded to include different work groups within a local area network. For example, if the local area network is divided into work groups, with each work group on a separate floor of a building with data "bridges" between them, the videoconferencing network according to the invention may be similarly configured with "video bridge" between work groups.

Figure 8:
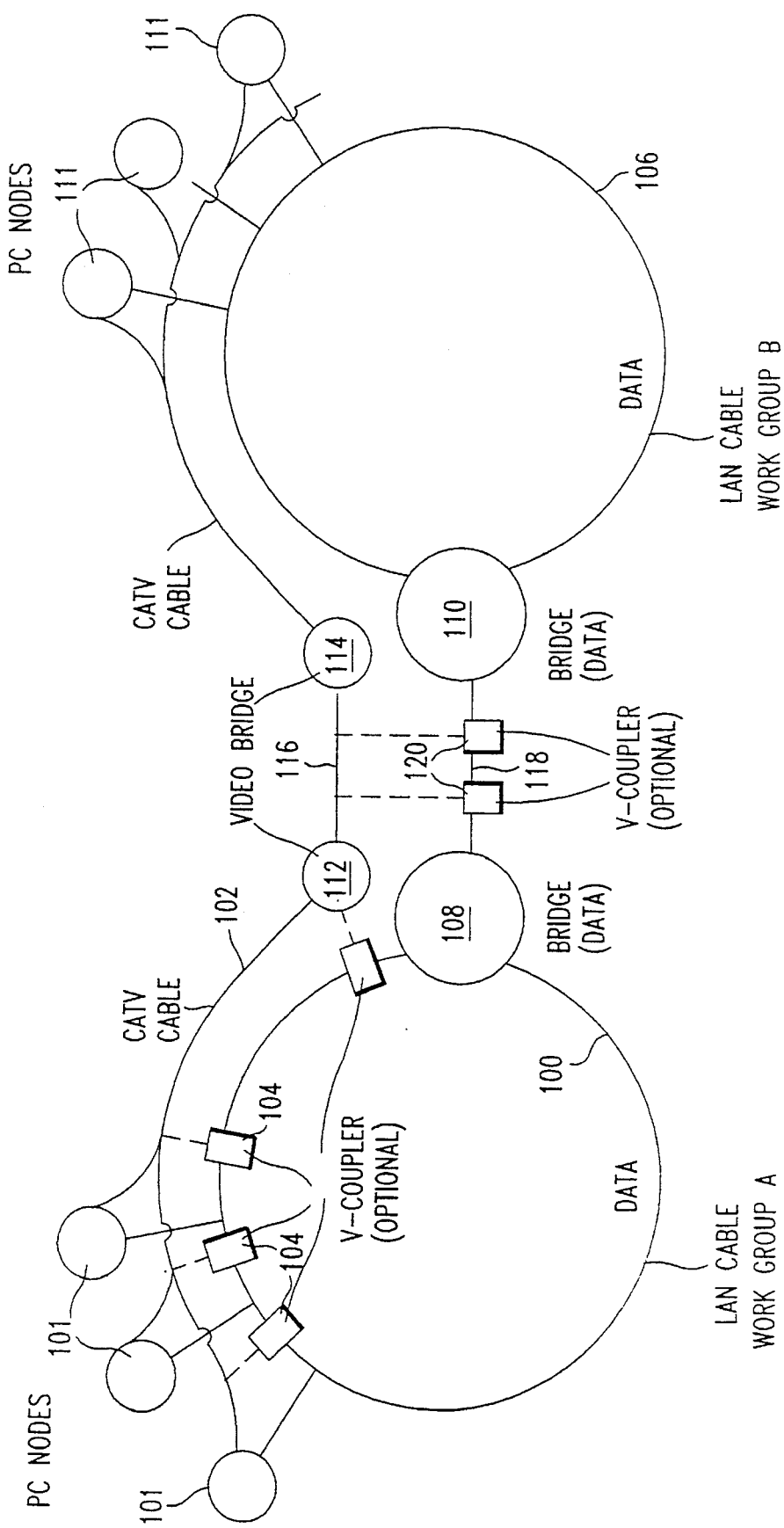
FIG. 8 is a representational diagram of the present invention employed in a local area network that is divided into two separate work groups.

FIG. 8 shows the basic configuration wherein a local area network is divided into two work groups: work group A and work group B. Work group A contains a number of PC nodes 101 arranged on a LAN cable 100 for data transmission and a video cable 102 for television transmission. Optionally, the cost of laying a separate video cable 102 may be avoided by providing V-couplers 104, enabling the transmission of television signals also on the LAN cable 100.

As is standard practice in the industry, the LAN cable of work group A is connected to the LAN cable 106 of work group B via data bridges 108 and 110, respectively. Such bridges enable data transmission from one of the workstations 101 in work group A to one of workstations 111 in work group B.

Similarly, television transmission between workstations in different work groups may be effected through video bridges 112 and 114, respectively, which are interconnected by a video cable 116.

The transmission of the television signals between the video bridges 112 and 114 may be optionally effected via the data cable 118 through the use of V-couplers 120.

The video bridges 112 and 114 comprise a number of "video switches" which adapt the frequency channel of a transmitted television signal from one work group to another. Since the maximum number of different television signals received by any one work group cannot exceed the number of PC workstations in that work group, the maximum number of video switches required in any given bridge is equal to the number of PC "nodes" in the group to which the bridge is connected.

Figure 9:
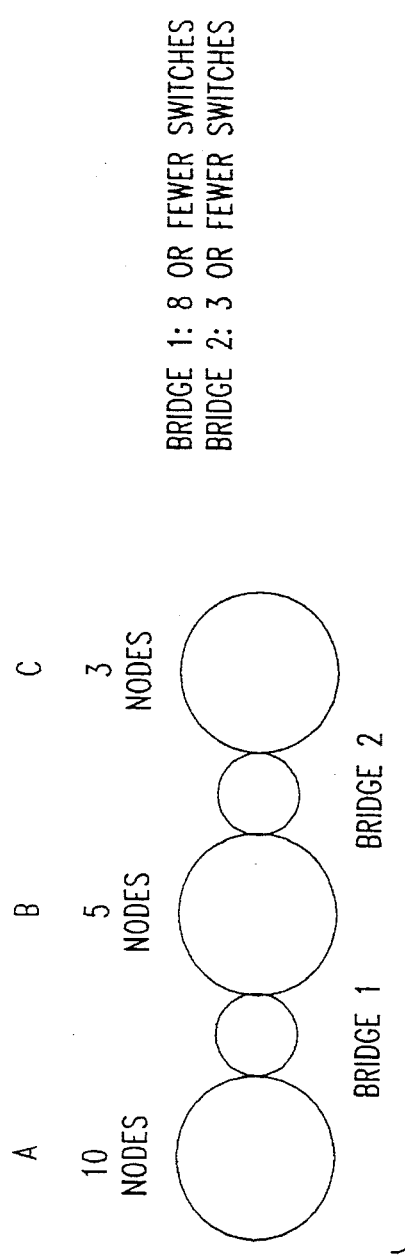
FIG. 9 is a representational diagram showing the number of "video bridges" required in a LAN divided into three work groups.

FIG. 9 provides the example of two bridges, bridge 1 and bridge 2, dividing work groups A, B and C, respectively. Bridge 1, which services work groups A and B, contains a maximum of eight switches because the ten nodes in work group A can communicate with a maximum of eight (five plus three) nodes in work groups B and C, respectively. Bridge 2, which services work groups B and C, contains a maximum of three switches because work group C contains only three nodes. The bridges 1 and 2 may have less than eight and three switches, respectively, because it is unlikely that all the nodes will be operative to transmit or receive television signals at the same time.

Figure 10:
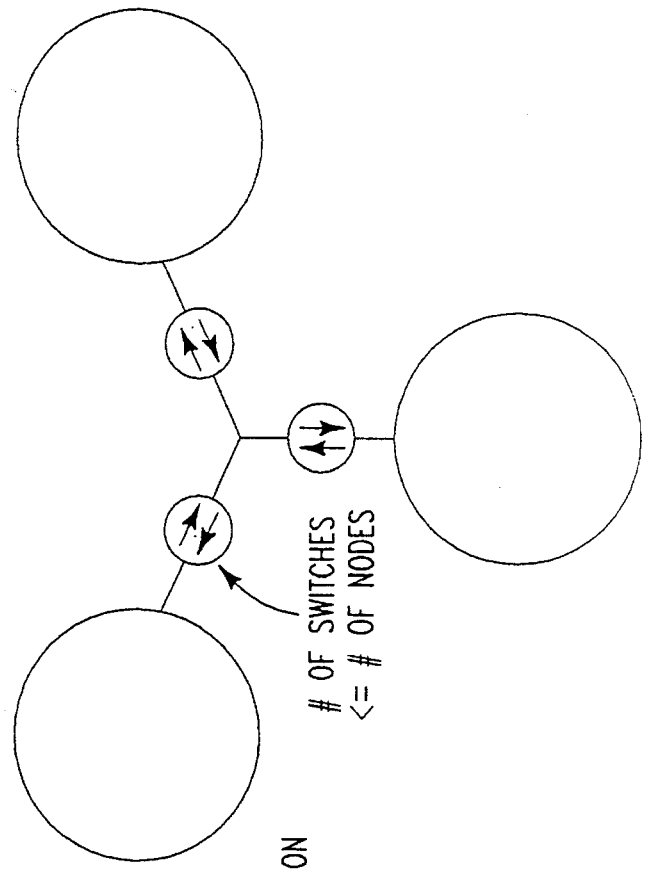
FIG. 10 is a representational diagram of a LAN divided into three work groups in a star configuration.

If the LAN work groups are arranged in a star configuration as is shown in FIG. 10, the number of switches in each video bridge must be equal to or less than the number of nodes in the associated LAN work group.

Figure 11:
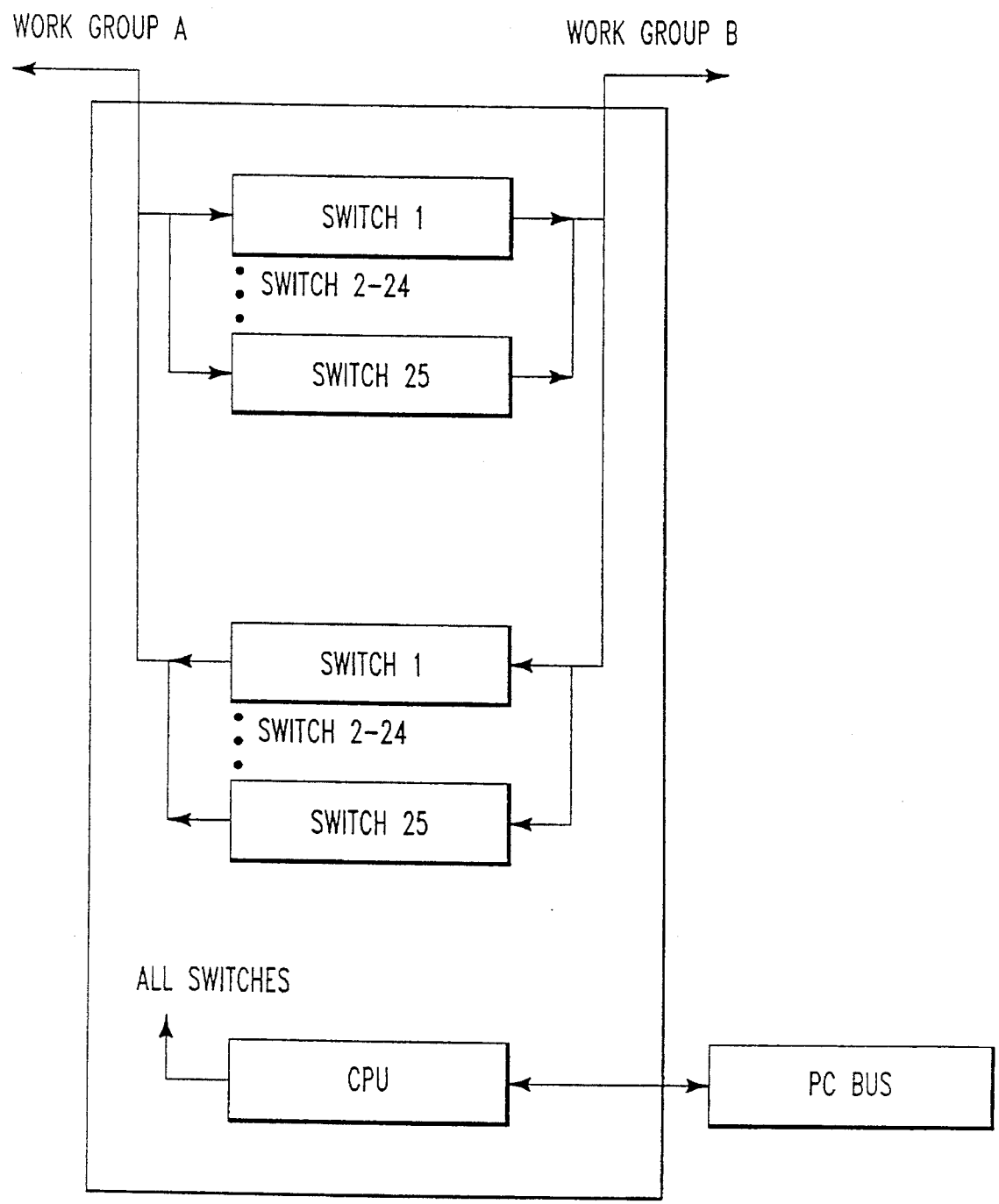
FIG. 11 is a block diagram of a video bridge comprising a plurality of video switches.

A preferred embodiment of a video bridge is shown in FIG. 11. As may be seen, the individual switches are connected in parallel. In this example, there are twenty-five switches for converting television transmissions from work group A to work group B and twenty-five switches for converting television transmissions from work group B to work group A. A single CPU, common to all switches, controls the channel selection (both the received channel and the transmitted channel) in each switch.

The video bridge of FIG. 11 can be used to convert the television transmissions from one work group to another, and can also be used as a repeater within the same work group. When used as a repeater, the frequency channel allocations of the television signals remains the same from one side of the bridge to the other.

Figure 12:
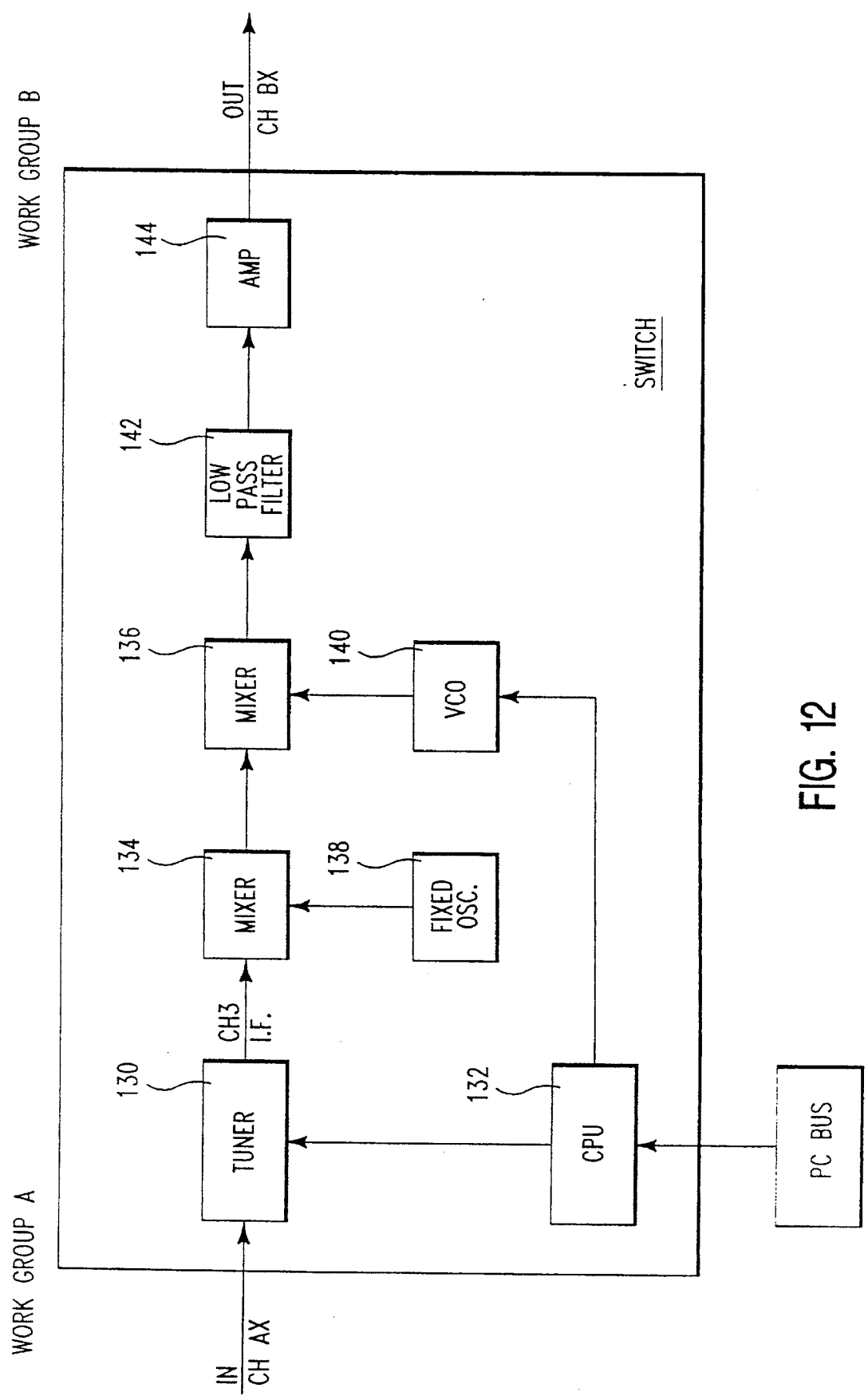
FIG. 12 is a block diagram of a single switch employed in the video bridge of FIG. 11.

FIG. 12 shows the contents of a video switch in detail. The television signal received from work group A on one of channels 2–55 is passed to a tuner 130 which demodulates the channel identified by a signal from the CPU 132. The television signal is output on channel 3 to mixers 134 and 136 which receive carrier frequencies from oscillators 138 and 140, respectively. The oscillator 140 is controlled by the CPU 132. The output of mixer 136, at the selected frequency channel, is laundered through a low pass filter 142 and then supplied to work group B via an amplifier 144.

The operation of the videoconferencing system according to the invention will now be described with reference to FIGS. 13 and 14. These figures detail the procedure for initiating and terminating a video conference call on a network having a baseband A-LAN and a broadband B-LAN.

Figure 13A:
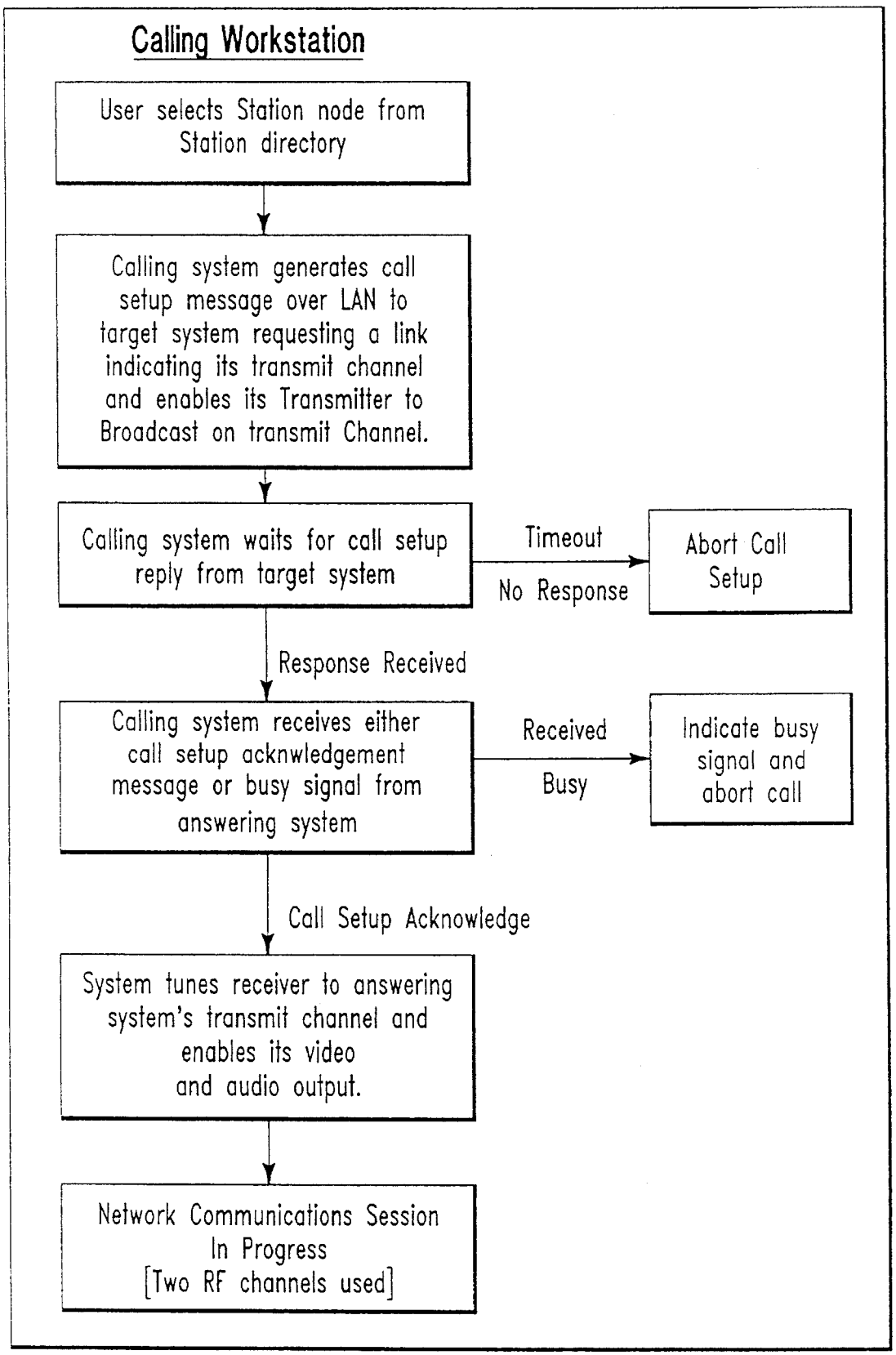
FIG. 13, comprised of FIGS. 13A and 13B, is a flow chart of a software program for a workstation, which controls the initiation of a video conference between workstations.
Figure 13B:
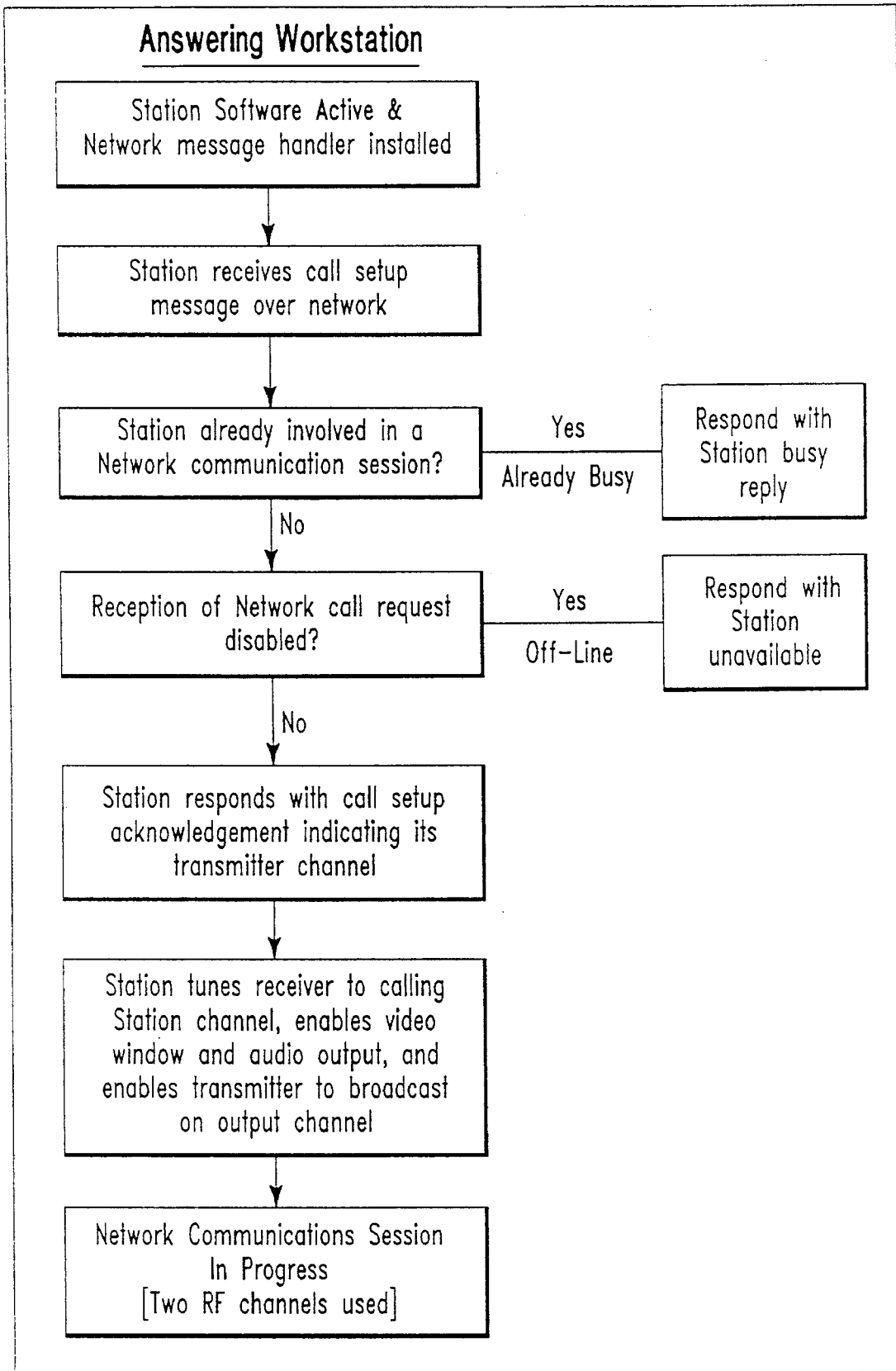
Figure 14A:
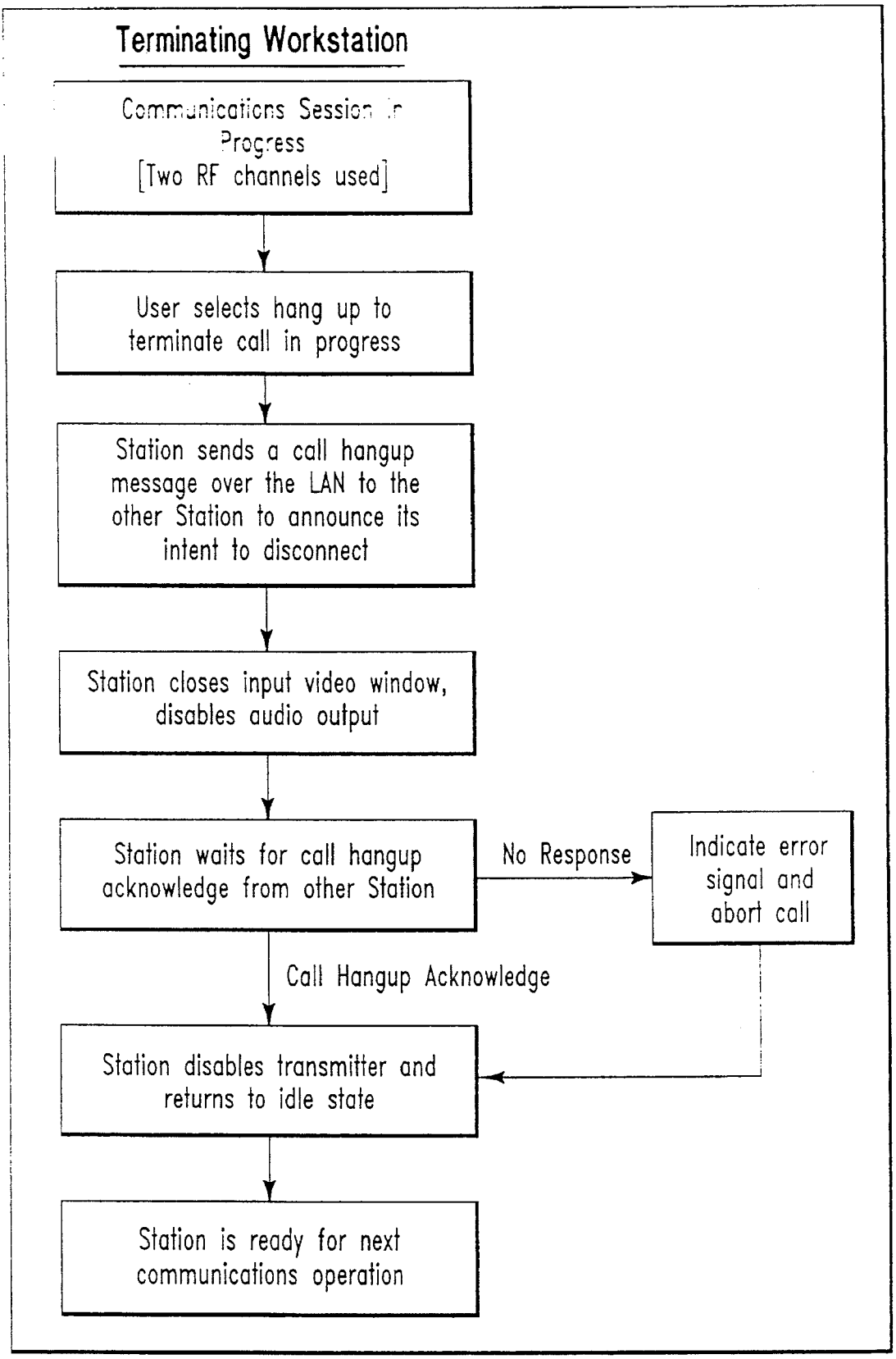
FIG. 14, comprised of FIGS. 14A and 14B, is a flow chart of a software program for a workstation, which controls the termination of a video conference between workstations.
Figure 14B:
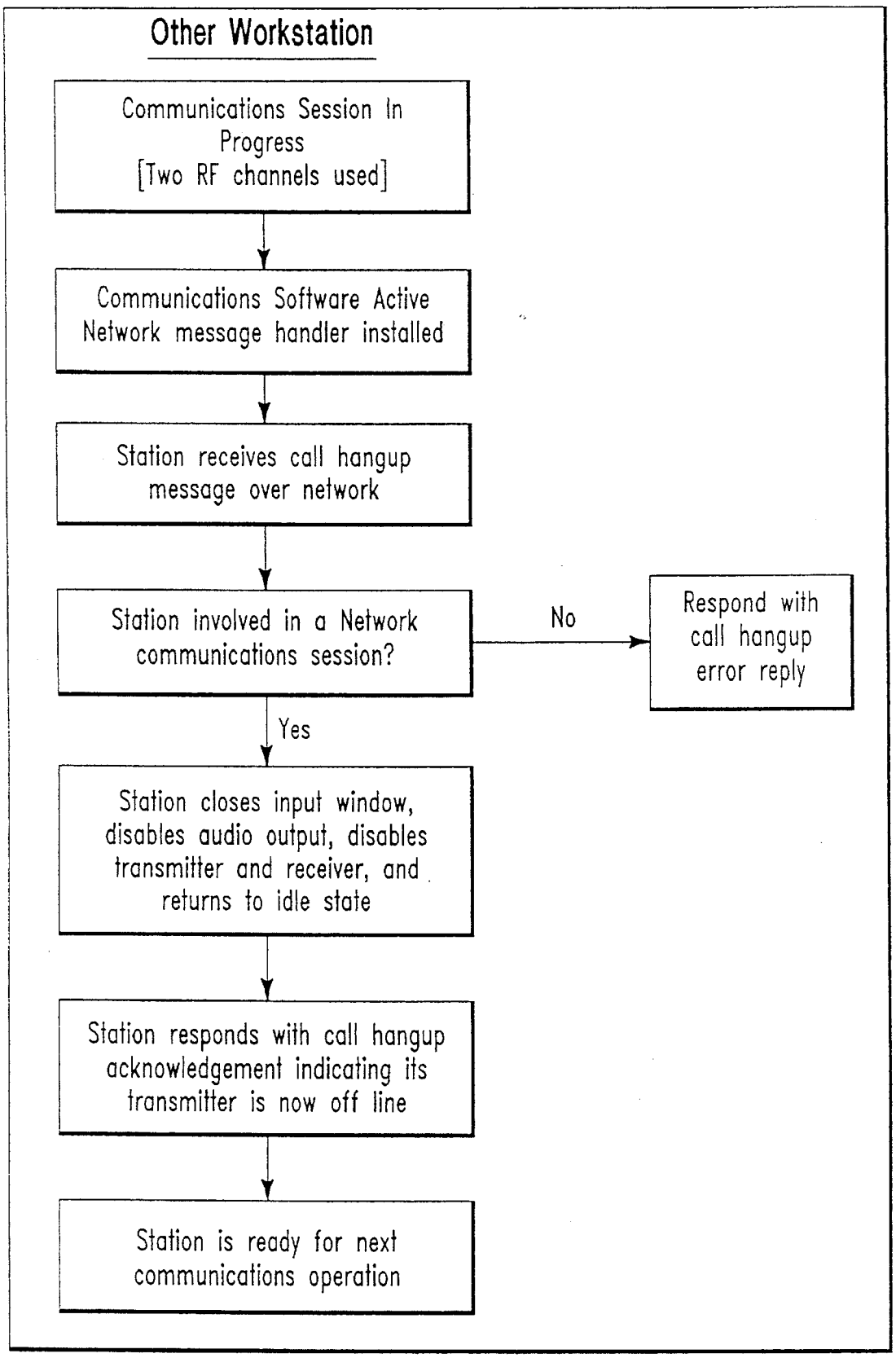

Flow charts showing the operation of the software in the initiating workstation are FIGS. 13A and 14A; flow charts for the responding workstation are FIGS. 13B and 14B.

In a typical videoconferencing session established in the system shown in FIG. 1, let us assume that the user of PC 2 wishes to conduct a videoconference with the user of PC X. The PC 2 software generates and transmits a call set up message over the A-LAN to the PC X requesting a link and indicating its transmit channel on the B-LAN. PC 2 then awaits a handshake reply from PC X. If no response is received within a prescribed time, the call may be aborted or some other options may be made available, such as the option to leave an audio, and possibly also a video message.

An audio message of any reasonable length, and one or more frames of a video message may be digitized and stored in the digital memory of a computer workstation (such as a hard disk) for later playback by the workstation users.

Meanwhile, the PC X receives the call set up message from PC 2 and sends a reply, indicating whether PC X is, or is not busy. If PC X is busy, the response includes a busy message which is transmitted to PC 2. If PC X is not busy, it may still respond with a message that is it is unavailable to take calls.

When PC 2 receives a responding message from PC X, it either aborts the call, if PC X is busy or unavailable, or acknowledges the call set up.

If PC X accepts the call, it responds to the call set up acknowledgement with its own message indicating the channel on which it will transmit. Thereafter, both PC 2 and PC X tune their receivers to the other workstation's channel, enable their video windows and audio outputs, and enable their transmitters to broadcast on their own transmit channel. The call then proceeds until one or the other workstations terminates the call.

Referring to FIG. 14 and assuming that the user of PC X terminates the call, this workstation sends a call hang-up message over the A-LAN to PC 2 to announce its intention to disconnect. PC 2 receives the call hang-up message and, unless this message was received in error, both workstations close their input video windows and disable their audio outputs. PC 2 then disables its transmitter and receiver and returns to the idle state. Thereafter, PC 2 transmits a call hang-up acknowledgement indicating that its transmitter is off line. When PC X receives this acknowledgement message, it disables its transmitter and returns to the idle state. Both workstations are then ready for the next videoconferencing call.

In the software system described above, each PC workstation maintains a state table, which is constantly updated, of the frequency channel allocations and the workstation status in the B-LAN network. Whenever a PC workstation initiates a call, a table look-up procedure is used to find a suitable vacant channel.

Alternatively, a single status table may be maintained in one of the workstations which serves as the network server (PC1 shown in FIG. 1). In this case, a request for frequency channel allocation is made via the A-LAN to this network server which performs a table look-up to find a vacant channel and then allocates the use of this channel for a video conference.

It will be understood that for each two-way video conference between workstations, two channels must be allocated: one for transmission to, and one for transmission from each workstation.

Figure 15:
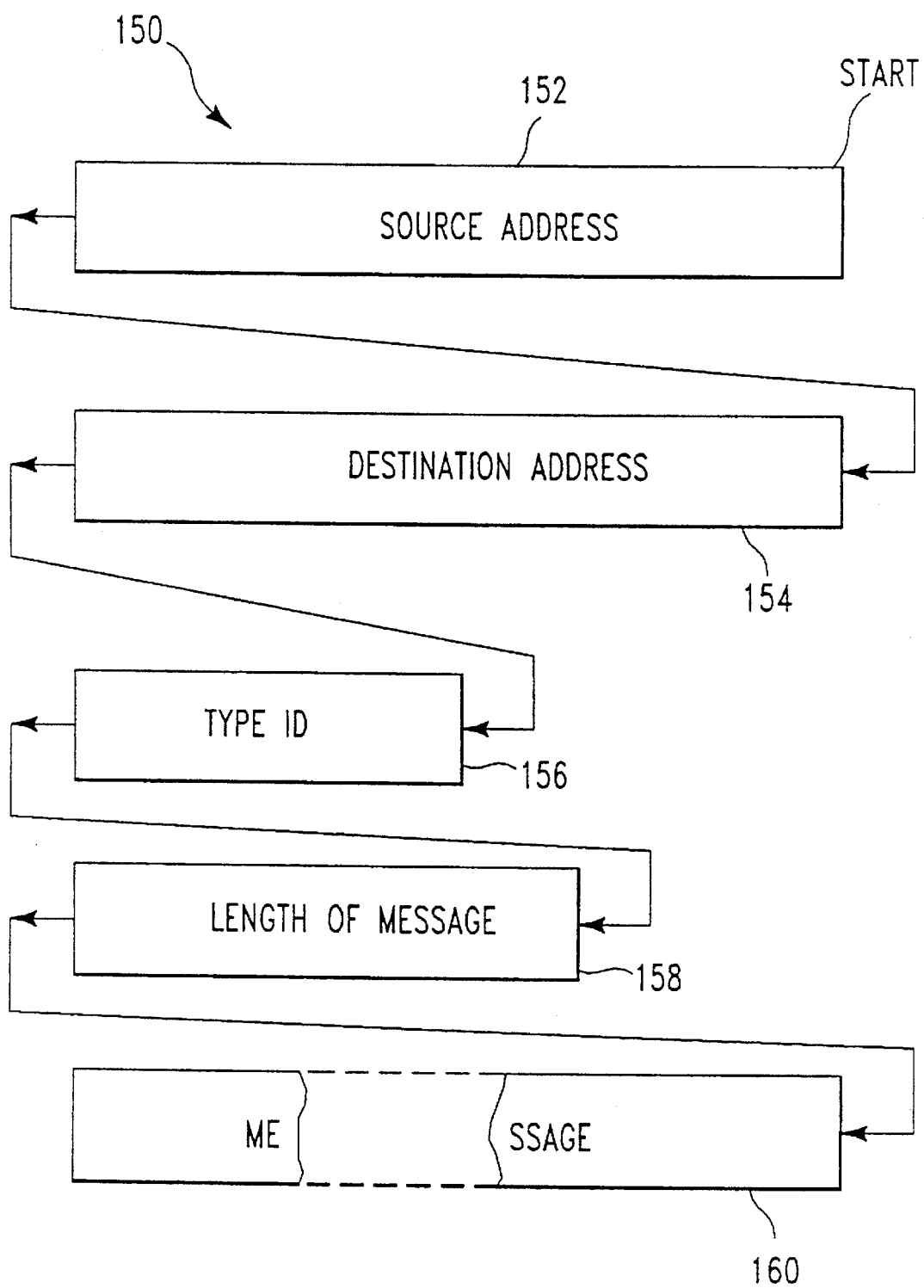
FIG. 15 is a representational diagram of a data message which is broadcast on the A-LAN by one workstation to all other workstations on this LAN.

FIG. 15 illustrates the format of a data message 150 which is generated at a workstation and "broadcast" over the A-LAN to all other workstations in the network. The data message comprises the following sections: a source address 152 (the address of the transmitting workstation); a destination address 154 (the address of the workstation or workstations to which the message is to be sent); the type identification 156 (identifying the "message type" as discussed below); the length of message 158 (identifying the length of the message that follows) and the message itself 160. The source address preferably contains a unique identifier for the workstation as well as an identifier for the particular workstation group (Group A, B, C, etc.), location (e.g., Building 21), company (e.g., XYZ Corp.), country, and the like. Similarly, the destination address may contain all these same elements or may be abbreviated if the destination node is in the same work group. The destination address may identify all workstations (nodes) of a particular class, such as all workstations within a particular work group.

The "type ID" 156 is a 16 bit section which identifies the type of message to be sent. The message types may be categorized as "network control messages", such as "workstation sign-on", "workstation sign-off", "channel request" and "channel in use", which are "broadcast" to all stations, and "call progress messages" which are normally sent to a specific one or more workstations. Typical call progress messages are "call request", "call answer", "call busy", "call private" and "answering machine pick-up", "call hang-up" and "call hang-up acknowledge".

The size of message section 158 simply indicates the bit length of the body of the message 160. The body of the message includes all other necessary information such as the caller's "handle" (nickname), the caller's transmitting channel and the like.

Figure 16:
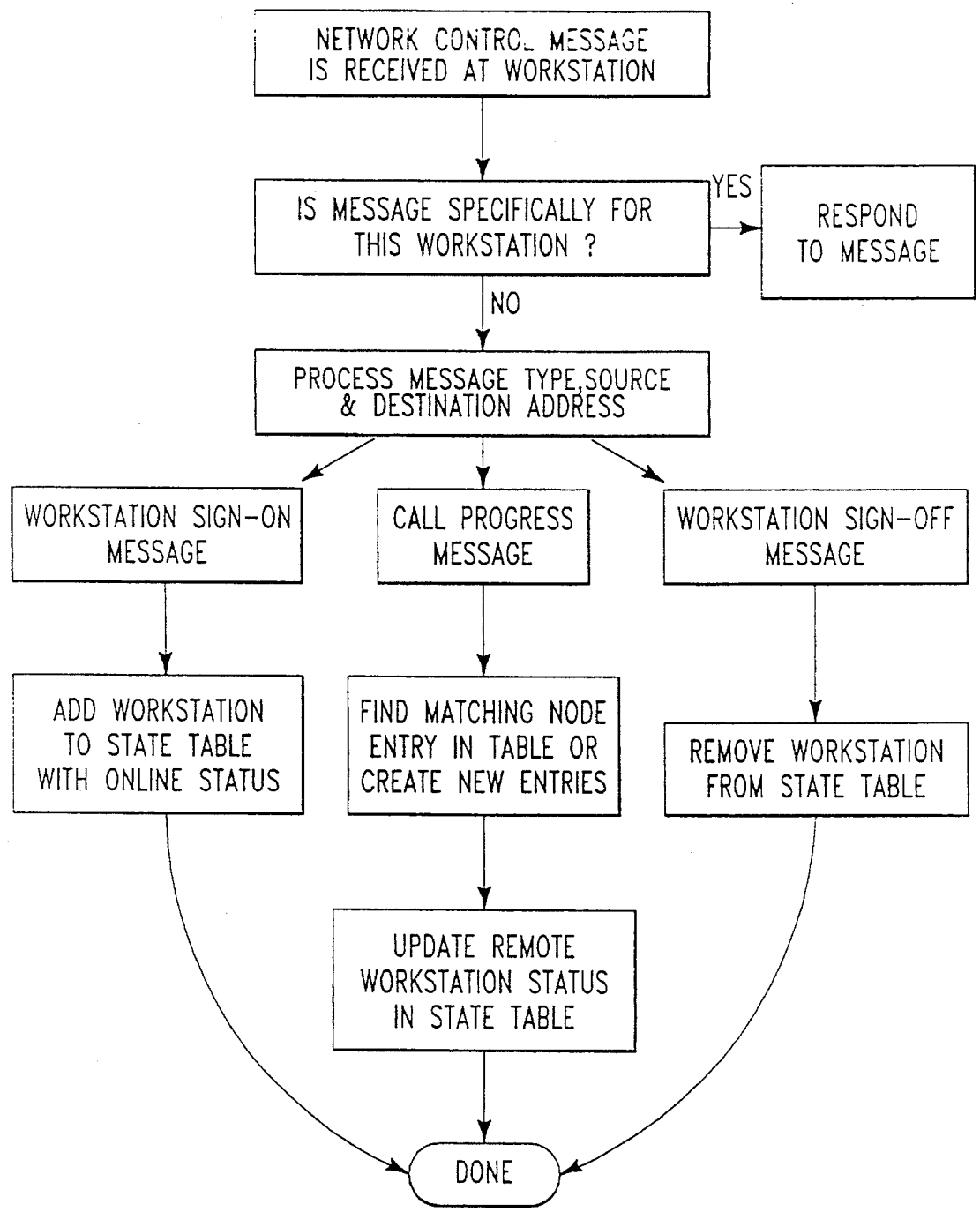
FIG. 16 is a flow chart of a workstation software program which adds updates to the workstation network "state table".

FIG. 16 illustrates how the data messages are used to update a network "state table" within each workstation. According to the invention, each workstation is capable of accessing and allocating available channels dynamically— that is, variably and in real time—. This dynamic channel selection and distributed control is facilitated by maintaining a current network state table within every workstation. Stored in each state table is the information and status which is "relevant" to the particular workstation; that is, the presence or absence of each active workstation (node) on the network; the availability and unavailability of each frequency channel; the participation of each workstation in a videoconferencing call, etc. The state tables across the network will not necessarily be identical depending upon the network access rights or the user subgroup designations.

As shown in FIG. 16, each data message of the type shown in FIG. 15 is received at each workstation and decoded to determine its destination. If the destination is specifically for this workstation, then the workstation responds to the message by taking any appropriate action, including transmitting a data message of its own. Such a message might, for example, indicate "busy", "unavailable" ("call private") or "call answer". Whether or not the call progress message is specifically addressed to the current workstation, the message is processed to update the state table.

If the data message is a "sign-on" message from a particular workstation, then the on-line status of this workstation is added to the state table. If the message is a "sign-off" message from a particular workstation, then the on-line status of this workstation is deleted. Call progress messages such as the "busy" message from a particular workstation, are processed by updating the remote workstation status in the state table. If a matching node (workstation) entry in the state table cannot be found, a new entry is created.

In addition to the state table, each workstation maintains a local "user's directory" or phone book of all the workstations on the local area network. This directory includes the identity of the workstation, which may be the name, "handle" and/or a reduced sized video image of the workstation user. For example, if the workstation is located on Jane Doe's desk, the workstation may be identified in the directory by the name Jane Doe, her handle "Mamma Bear" and a video image of Jane Doe's persona (for example, her head and shoulders). Workstations not associated with a particular user may be designated in any other convenient manner, such as "Conference Room A", etc.

Figure 17:
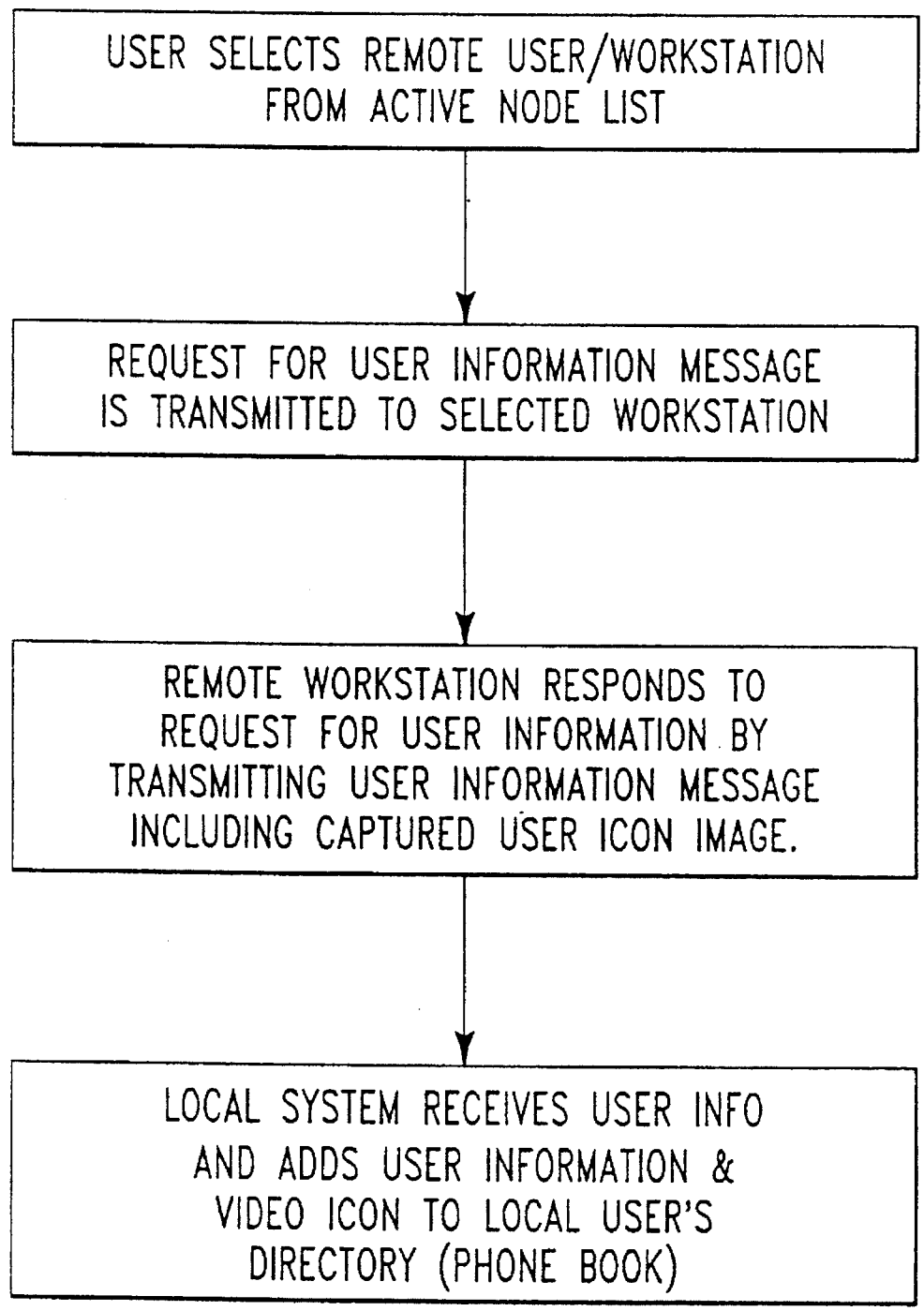
FIG. 17 is a flow chart of a workstation software program which adds a workstation "node" to the local "user's directory".

To update the directory of a given (own) workstation within the network, the workstation user selects another user/workstation from the active node list, obtained from the state table, as indicated in FIG. 17. A data message requesting user information is then transmitted to the selected workstation and the latter responds by transmitting a "user information" message including a "snapshot" image of the user at this workstation.

The given (own) workstation receives this user information and adds it to this workstation's directory.

Figures 18A, 18B:
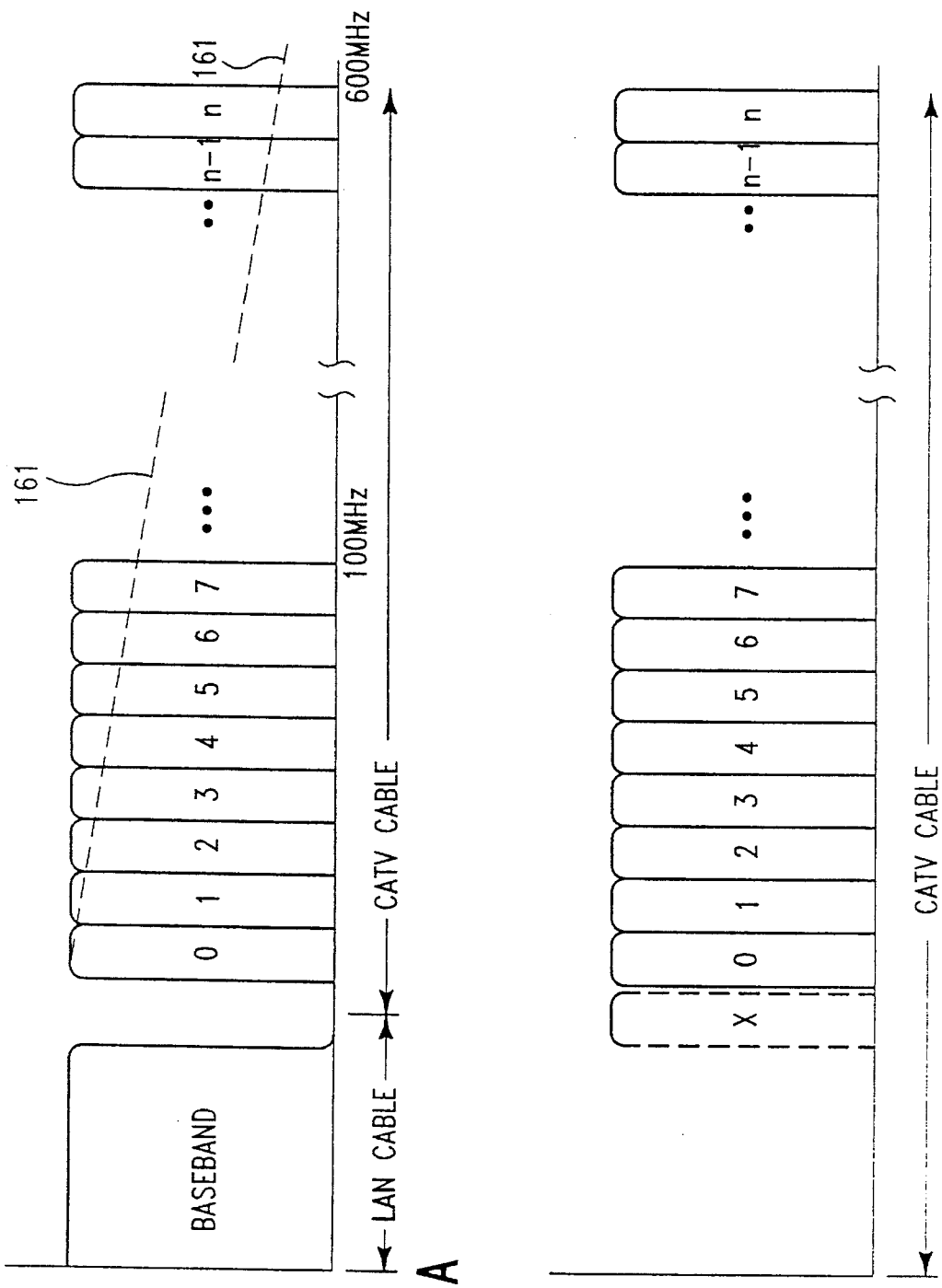
FIG. 18, comprised of FIGS. 18A and 18B, are diagrams of the frequency spectrum utilized by the videoconferencing network according to the invention in which the workstations are interconnected by both a LAN cable and a CATV cable (FIG. 18A) or by a CATV cable alone (FIG. 18B).

FIG. 18 illustrates the frequencies used in transmitting the data messages (FIG. 15) on the A-LAN and the television signals on the B-LAN. FIG. 18A illustrates the configuration shown in FIG. 1 wherein the PC workstations PC2 . . . PCX are interconnected by a LAN cable 16 and a CATV cable 18. In this configuration the data messages are transmitted as conventional LAN messages in the baseband frequency range from 0 to 30 MHz. The television signals are transmitted on one of the 6 MHz wide television channels in the frequency range from 40 to 600 MHz. The dashed line 161 indicates the relative attenuation due to physical limitations of the cable.

FIG. 18B illustrates an alternative embodiment wherein a television channel X, immediately below channel zero is dedicated for signalling; that is, transmitting the data messages between workstations or station nodes. In this case, the workstations are interconnected only by a CATV cable. The "A-LAN" comprises channel X on this cable while the "B-LAN" comprises channels o-n.

Figure 19:
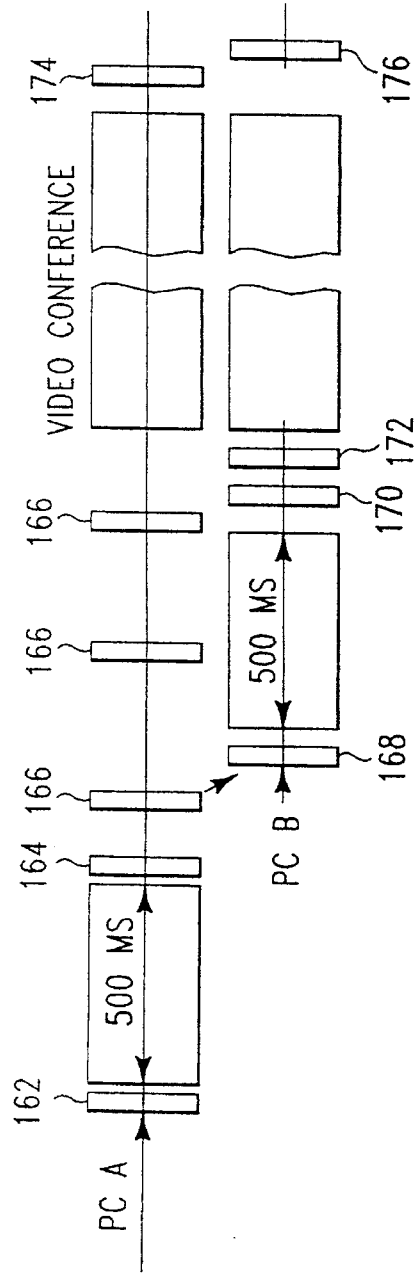
FIG. 19 is a representational timing diagram showing how data messages are used to establish and terminate a videoconference between two workstations.

FIG. 19 illustrates the exchange of data messages required to set up and eventually terminate a videoconference. Assuming that the user of PC A wishes to set up a videoconference with the user of PC B, PC A initiates a call sequence by transmitting a channel request message 162. This message identifies the channel which PC A selects for transmission. The channel is selected by reference to the state table, to determine which channels may be (have a high likelihood of being) vacant. Channel selection is biased toward the lower frequency channels to minimize cable attenuation.

After transmission of a channel request message, the PC A waits for a fixed period, such as 500 milliseconds, to insure that the selected channel is free. If, for any reason, the state table in PC A was incorrect in indicating that the selected channel was available for use, the PC A will receive a "channel in use" message from another workstation that has previously captured this selected channel.

If PC A has not received such a message by the end of the waiting period, PC A will issue a "channel in use" message 164. This message announces to all other workstations that the selected channel has been taken, causing all other workstations to update their state table. Thereafter, PC A issues a call request message 166 to a particular destination; namely, PC B. This message is sent repeatedly until a response is received from PC B. This call request message includes such information as the "handle" of the user of PC A as well as the selected channel on which PC A will transmit.

Upon receipt of the call request message 166, the PC B initiates a channel request procedure identical to that just completed by PC A. In particular, PC B transmits a channel request message 168, identifying a selected channel, and then waits for a fixed period (e.g., 500 MS) to insure that the selected channel is vacant. Thereafter, PC B broadcasts a channel in use message 170 and then a call answer message 172 giving the address of PC A as its destination. Following the call answer message, a videoconference takes place for an indeterminate length of time until one of the parties, the user of PC A or the user of PC B, decides to terminate the call. In the example shown in FIG. 19, PC A transmits a call hang up message 174 to PC B which responds by transmitting a call hang up acknowledge message 176 to PC A. If the acknowledge message is not received at PC A within a prescribed time, PC A repeats the call hang up message 174. All workstations may then update their respective network state tables upon receipt of the hangup messages.

A single CATV cable is capable of carrying television signals on about 64 channels simultaneously for a reasonable distance without appreciable attenuation. Since two channels are required for every duplex transmission, one cable can theoretically handle up to 32 simultaneous videoconferences. Since there is no limit to the number of workstations which can be connected to the cable, the maximum of 32 simultaneous videoconferences may be too restrictive in some large systems.

Furthermore, as mentioned previously, it is desirable to provide at least one vacant channel between two active channels to minimize cross talk between adjacent active channels. Also, it is desirable to avoid the high channel numbers when transmitting between workstations that are some distance apart because cable attenuation increases with an increase in frequency.

Figure 20:
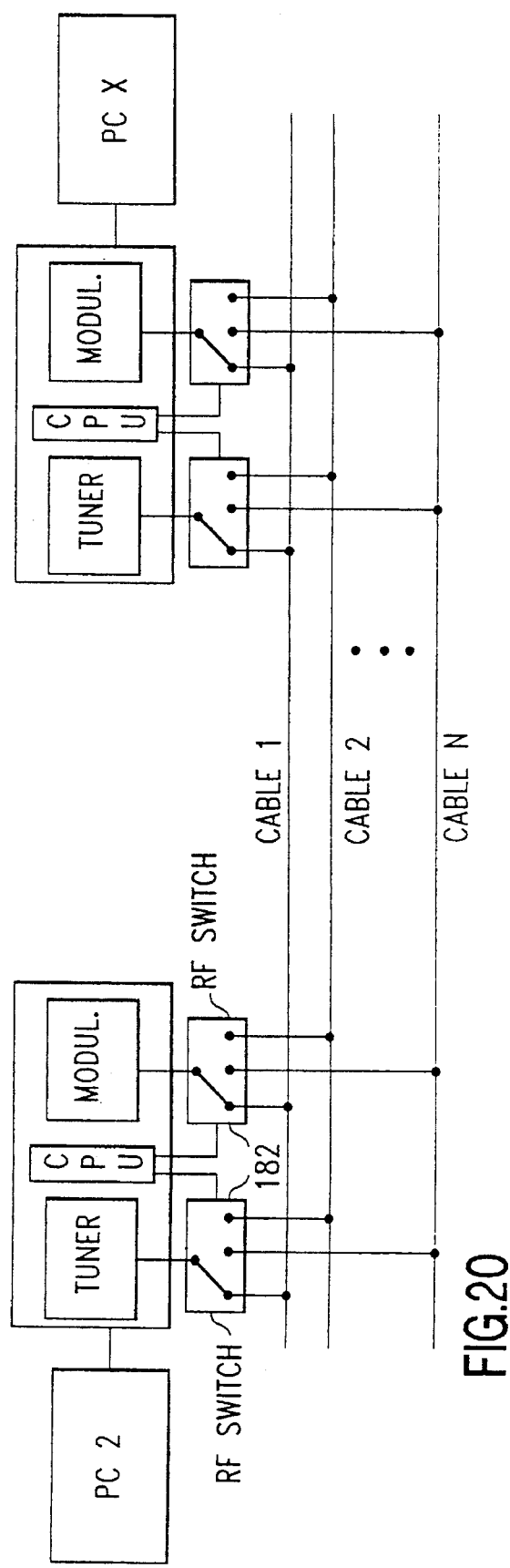
FIG. 20 is a block diagram showing how a plurality of workstations can be connected via a plurality of CATV cables to provide as many frequency channels as desired.

The system of FIG. 20 provides a solution to the restriction that a single cable provides only a limited number of channels. As is indicated in this figure, the number of available channels can be doubled, tripled, etc. by providing a multiplicity of cables 1, 2 . . . N in parallel. In this case, an RF switch 182 is connected to the tuner and modulator of each workstation to provide connection to the proper cable. The position of the RF switch is controlled by the CPU of each workstation.

When operating with multiple CATV cables, it is necessary to broadcast the cable number along with the selected frequency channel in a channel request message and a call request message. Upon receipt of a call request message indicating a particular cable number and channel, a workstation will set its RF switch to receive a television signal from the particular, selected cable.

Figure 21A:
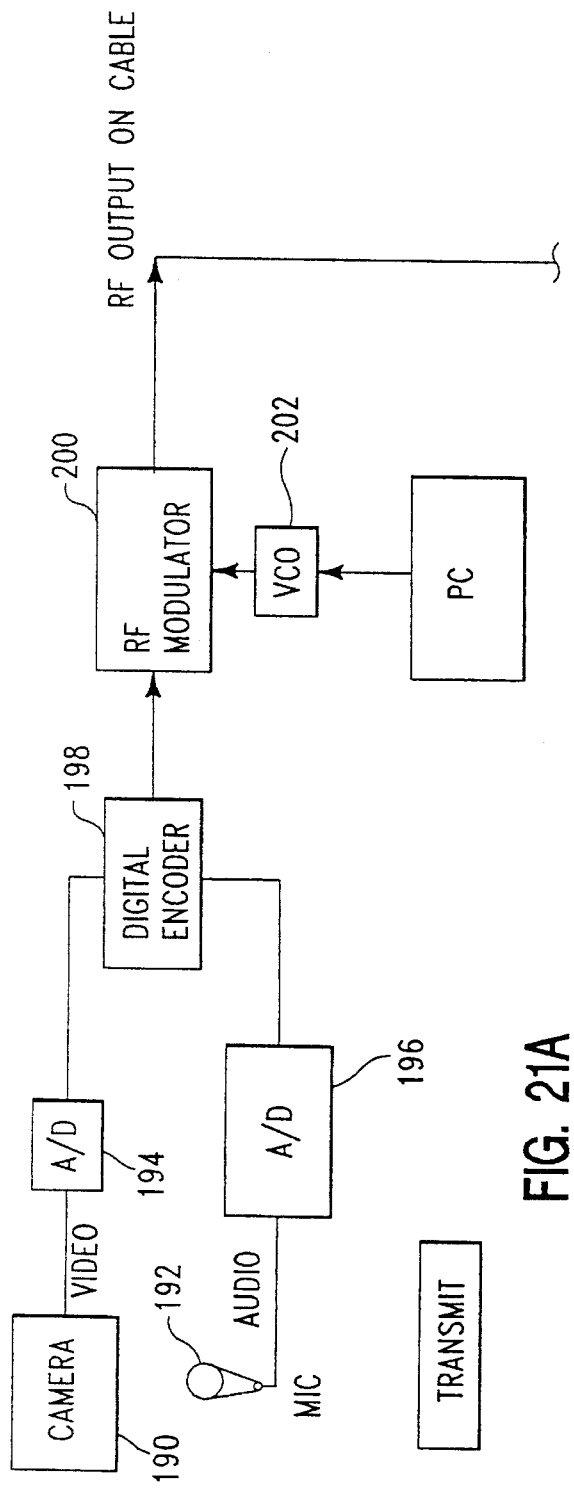
FIG. 21, comprised of FIGS. 21A and 21B, is a block diagram showing how analog audio and video information can be transmitted on a selected frequency channel in digital form (FIG. 21A) and then retrieved as analog audio and video information at the receiving workstation (FIG. 21B).

FIG. 21 illustrates an embodiment in which the television signal is digitized and compressed prior to transmission on the B-LAN cable. FIG. 21A shows that the analog video and audio signals received from the camera 190 and microphone 192, respectively, are passed to analog to digital converters 194 and 196. The outputs of these two A/D converters are multiplexed and compressed in a digital encoder 198. The output of the encoder 198 is passed to the RF modulator 200 which receives the selected carrier signal from the voltage control oscillator (VCO) 202 controlled by the workstation computer.

Figure 21B:
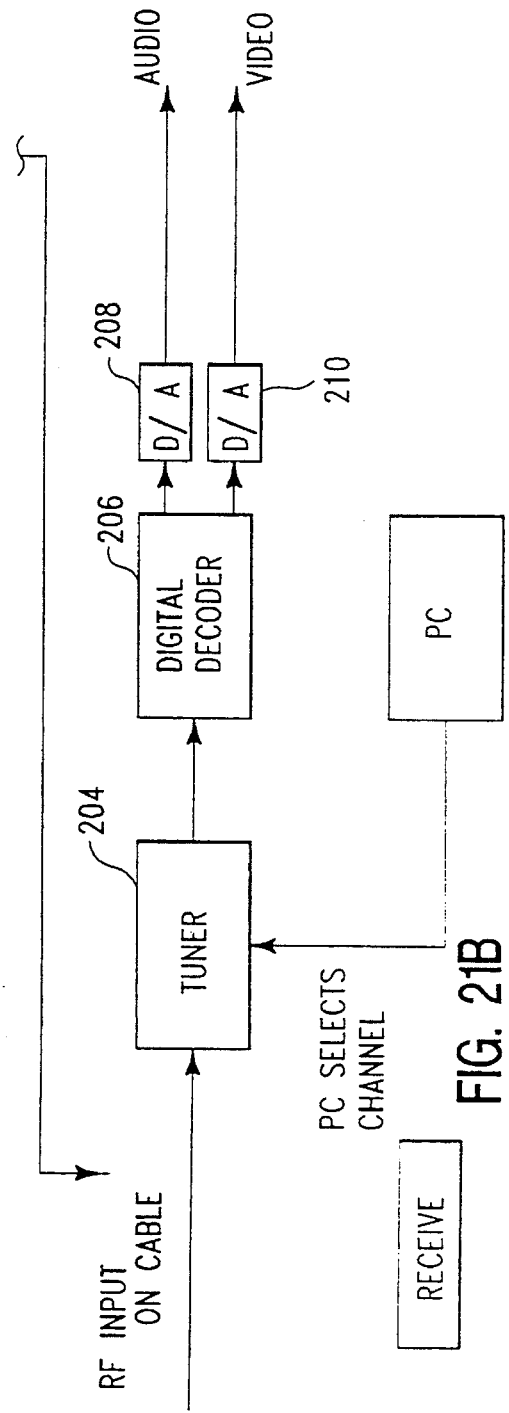

At the receive end, shown in FIG. 21B, the modulated carrier is received and demodulated at a tuner 204 which has been set to detect the appropriate channel by the workstation computer. The demodulated signal (at baseband) is passed to a digital decoder 206 which decompresses the digital signal and separates the audio and video portions. These respective digital signals are then passed through digital to analog converters 208 and 210 to reconstitute the original analog audio and video signals, respectively.

With the system of FIG. 21, the video signal is digitized frame by frame at the full-motion frame rate of 30 frames per second. Compression may be effected by comparing successive frames and transmitting only the portions of each frame which are changed from one frame to the next. Such digital encoding and compression techniques are well known in the art.

Through digital encoding and compression or other analog techniques it is possible to reduce the bandwidth of the RF frequency channel. It is accordingly possible to increase the number of channels transmitted on a single CATV cable. This arrangement may avoid the need for providing multiple cables in the manner shown in FIG. 20.

Figure 22:
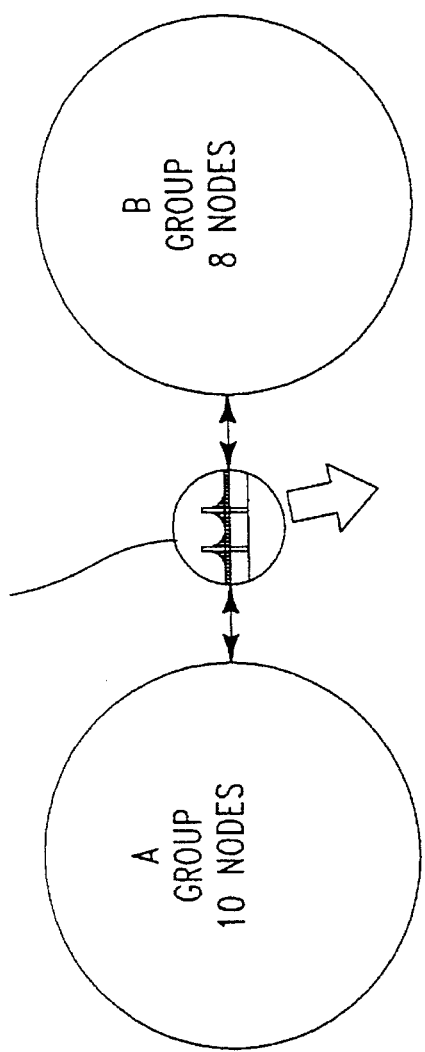
FIG. 22 illustrates two groups of workstations, Group A and Group B, interconnected by a "static multichannel bridge".

If the number of available channels is sufficient, it is possible to considerably simplify the "video bridge" between work groups. FIG. 22 illustrates such a bridge between a work group A with ten nodes and a work group B with eight nodes. In this example, both work group A and work group B each have 64 available channels. Of these, 16 channels are used exclusively for transmission between the two work groups; the remaining 48 channels are used for transmissions (videoconferencing) between nodes within a work group. The following Table illustrates this channel allocation:

TABLE

|  | A Group Channel No. |  | B Group Channel No |  |
|---|---|---|---|---|
|  | 1 | LOCAL PRIVATE | 1 |  |
|  | 2 | CHANNELS | 2 |  |
|  | . |  | . |  |
|  | . |  | . |  |
|  | . |  | . |  |
|  | 48 |  | 48 |  |
| BRIDGE INPUT CHANNELS | 49 |  | 49 | BRIDGE OUTPUT CHANNELS |
|  | . |  | . |  |
|  | 56 |  | 56 |  |

TABLE-continued

| | A Group Channel No. | B Group Channel No | |
|---|---|---|---|
| BRIDGE OUTPUT CHANNELS | 57 . . . 64 | 57 . . . 64 | BRIDGE INPUT CHANNELS |

With the channel allocations indicated in the Table, all communications between nodes of either the A group or the B group are carried out on channels 1–48 within that group. However, if a workstation in group A wishes to videoconference with a workstation in group B, then the A workstation transmits on a bridge output channel—channel 61 for example—and receives on a bridge input channel—channel 52 for example. Similarly, the workstation in group B transmits on a bridge output channel—channel 52—and receives on a bridge input channel—channel 61—.

This allocation of channels considerably simplifies the work group-to-work group bridge. In this case, the bridge is not required to convert one channel frequency to another as in the case of the bridge illustrated in FIGS. 11 and 12.

Figure 23:
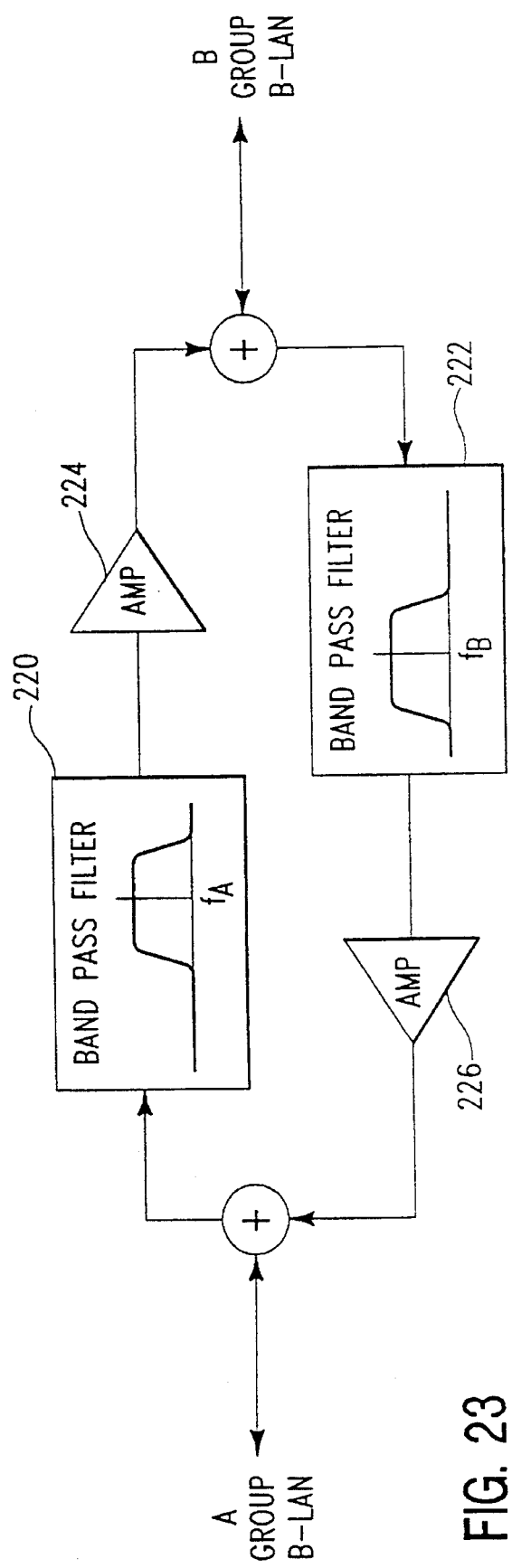
FIG. 23 is a block diagram of a static multichannel bridge of the type employed in the system of FIG. 22.

FIG. 23 illustrates a so-called "static multichannel bridge" which may be used when the channels have been allocated in the manner described above. This bridge effectively blocks transmission of the local private channels—e.g., channels 1–48—from one work group to another. The bridge comprises a bandpass filter 220 for the bridge output channels of work group A—e.g., channels 57–64—and a bandpass filter 222 for the bridge output channels of work group B—e.g., channels 49–56. Amplifiers 224 and 226, respectively, ensure that the signals received from each bandpass filter are at the proper level and are transmitted in one direction only.

With the bridge of FIG. 23, the inter-group channels are amplified and transmitted in the proper direction and transmissions on the local private channels are retained within each group.

As noted above, cable attenuation effects higher frequency channels to a greater degree than the low frequency channels. Consequently, it is advantageous to connect the multichannel bridge to the midpoint of a cable within each work group. Any remaining problems of attenuation can be eliminated by the amplification in the bridge.

FIG. 24 illustrates a relatively simple and inexpensive circuit for securing the video information against unauthorized access. As explained above, it is possible to secure the RF signal against monitoring by a conventional television set by either inverting the video signal or by transmitting the audio signal in AM, where FM transmission is the standard, or FM where AM transmission is the standard.

Figure 24A:
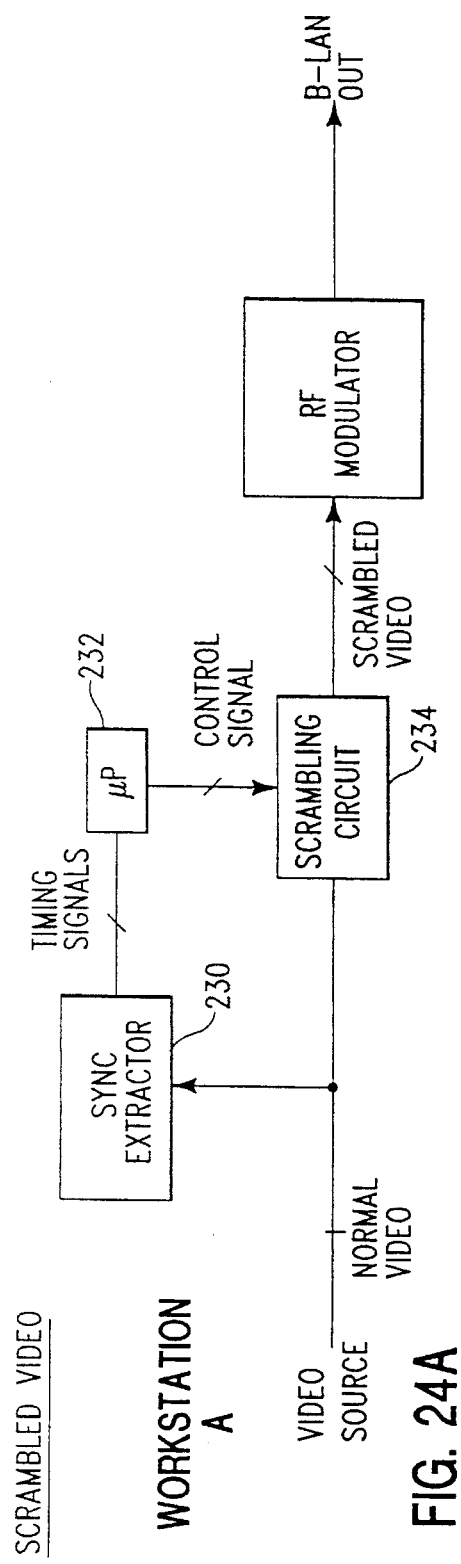
FIG. 24, comprised of FIGS. 24A and 24B, are block diagrams of a video scrambler circuit (FIG. 24A) and descrambler circuit (FIG. 24B) for providing security in the videoconferencing network according to the present invention.

The circuit of FIG. 24A may be inserted in the video signal stream to "scramble" the video signal prior to RF modulation. This circuit comprises a sync extractor 230 which passes timing signals to a microprocessor 232. The microprocessor generates control signals which are passed to a scrambling circuit 234. The scrambling circuit adds (or subtracts) a different DC voltage to each successive scan line, inverts the signal of every other scan line, or effects some other simple change that causes the image to "disappear" if displayed without descrambling.

Figure 24B:
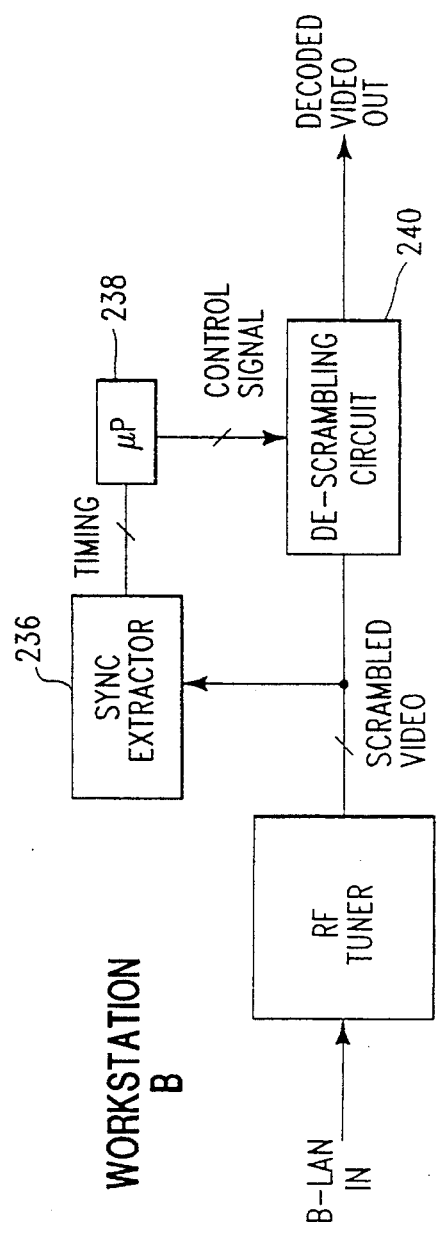

FIG. 24B illustrates how the scrambled video signal is descrambled. A sync extractor 236 provides timing signals to a microprocessor 238 which, in turn, generates control signals for the descrambling circuit 240. The descrambling circuit effectively removes whatever change was made to the signal, scan line by scan line, by the scrambling circuit 234.

Figure 25:
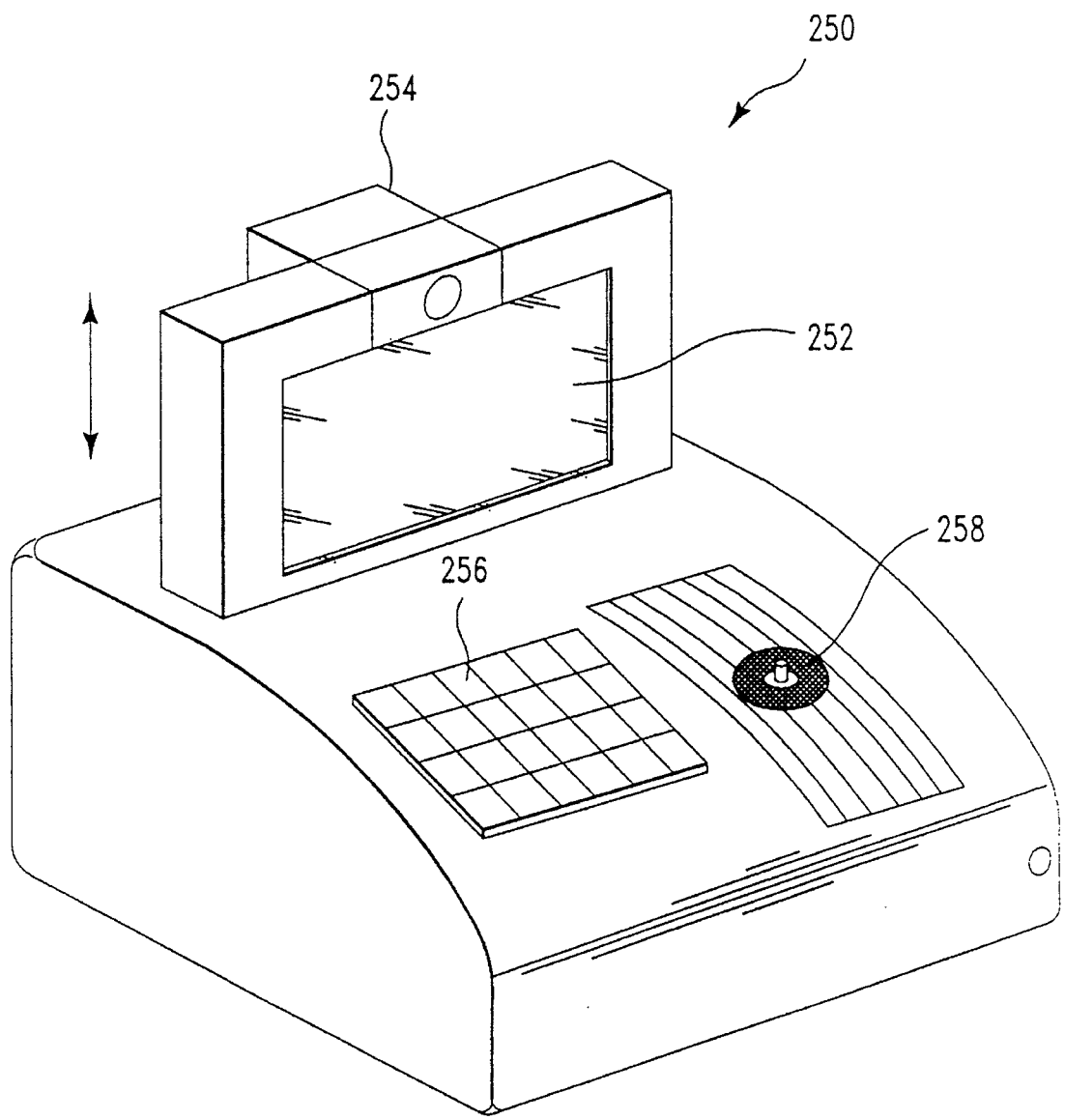
FIG. 25 is a representational, perspective view of a "stand-alone" station of the type employed with the videoconferencing network according to the present invention.

Up to this point, each videoconferencing station has been described as comprising a conventional digital computer or "personal computer". It is also possible to provide a dedicated, stand-alone videoconferencing station, for example as illustrated in FIG. 25. This unit 250 may include a "pop-up" active matrix display screen 252 with a built-in camera 254. If it is to be used as a conventional telephone, it may also include a conventional telephone handset (not shown). Preferably, however, the unit operates as a speaker phone, in the same manner as the PC workstations heretofore described.

As the user interface, the unit 250 is provided with a keypad 256 and a tract ball 258 for moving the cursor on the display screen. In all other respects, the unit 250 contains the same electronic circuitry (hardware) and software as a PC workstation modified for videoconferencing as described above.

Figure 26:
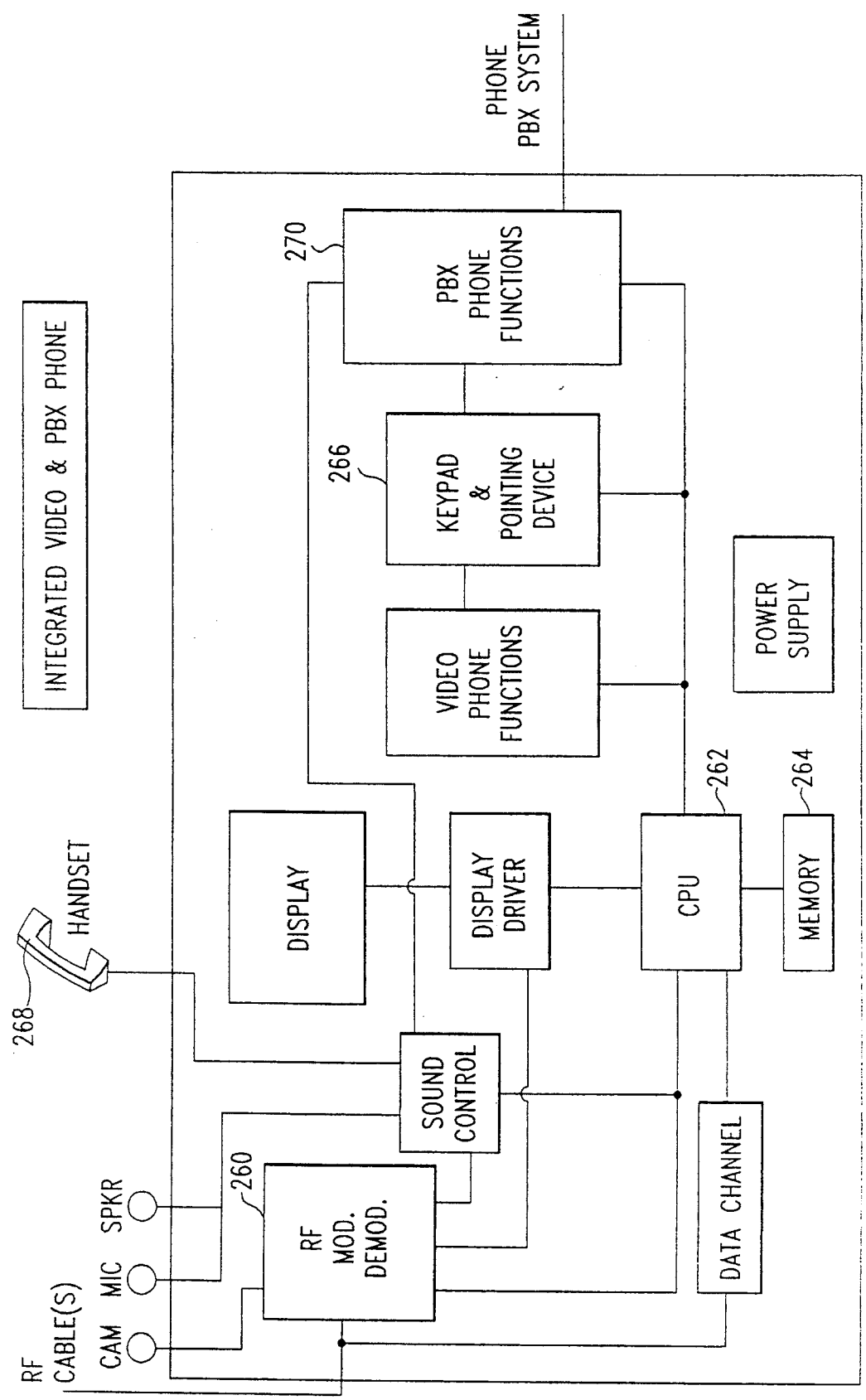
FIG. 26 is a block diagram of an integrated stand-alone video station and a telephone unit connectable to a conventional private automated branch exchange (PABX).

The stand-alone station 250 may be used exclusively on an A-LAN and B-LAN or it may be integrated into a conventional private automated branch exchange (PABX) telephone system. FIG. 26 illustrates the major elements which are required for utilization of the unit 250 as a conventional telephone.

As explained above, the videoconferencing capability of the station requires a camera, microphone and speaker, as well as an RF modem (modulator/demodulator) 260 connected to one or more RF cables, for example, through an RF switch as prescribed in connection with FIG. 20. In this embodiment, signalling is provided on a separate data channel, as described above in connection with FIG. 18B. All functions of the unit are controlled and coordinated by a central processing unit 262 which executes software stored in memory 264.

A keypad and cursor pointing device 266 provide the user interface to the system. Video phone functions—such as a picture icon phone directory—are displayed on the screen in menu form for selection by the user.

In addition to all of the videoconferencing features and capabilities heretofore described, the station is also connected to a PABX and can be used in a conventional manner as a telephone extension. A separate handset 268 is provided as are the conventional PABX phone functions 270 which are selectable by use of the keypad. In this way, a single instrument may be used as both a conventional telephone and a video conferencing station.

There has thus been shown and described a novel videoconferencing system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A videoconferencing network for a plurality of digital computer stations, wherein each station includes:

(1) an image display;

(2) a digital computer for processing data in accordance with a software program, said computer being connected to supply image and control signals to said display for displaying data thereon;

(3) a video camera for producing video signals representing an image;

(4) a microphone for converting sound into an audio signal;

(5) a modulator having an output port, connected to said digital computer, said video camera and said microphone, for converting video signals received from said camera and associated audio signals received from said microphone into television signals at a selected frequency channel and supplying said television signals at said output port;

(6) a demodulator having an input port, connected to said digital computer, for converting television signals at a selected frequency channel received at said input port into video signals and associated audio signals;

(7) a display controller connected to said demodulator for converting video signals received from said demodulator into image and control signals supplied to said display for displaying a video image on said display; and (8) a sound transducer connected to said demodulator for converting audio signals received from said demodulator into sound;

said network comprising in combination, a broadband local area network (B-LAN) directly connected to said input and output ports of said plurality of stations, for transmitting and receiving television signals between selected ones of said stations, each television signal being transmitted at a selected frequency channel;

said B-LAN comprising a two-way transmission line having a plurality of connection points, each directly coupled to one of said input and output ports, and extending from a first station to a remote, second connection point coupled to the input and output port of a second station, said transmission line being capable of two-way transmission between any two connection points, including said first and second connection point, via a first frequency channel for transmission in one direction and a second frequency channel for transmission in the opposite direction.

2. The videoconferencing network defined in claim 1, wherein said two-way transmission line includes a single CATV cable having a first end, a second, remote end and a single coaxial strand extending between said first and second ends, such that only a single strand of said one cable extends from said first connection point to said second connection point.

3. The videoconferencing network defined in claim 2, wherein said B-LAN includes a plurality of CATV cables arranged in parallel and a plurality of RF switches, each coupling all of said CATV cables to the input/output port of one station and operative to connect said input/output port to a selected one of said cables.

4. The videoconferencing network defined in claim 1, further comprising a codec, connected to said B-LAN, for digitally encoding and decoding television signals for transmitting and receiving encoded digital television signals to and from a telephone network.

5. The videoconferencing network defined in claim 1, wherein said B-LAN is divided into a plurality of work groups, said network further comprising an RF bridge connecting the B-LAN of one group with the B-LAN of another work group, for changing the frequency channel of the television signals transmitted on said B-LAN from one work group to another.

6. The videoconferencing network defined in claim 5, wherein said RF bridge includes a plurality of controllable switches connected in parallel, each switch being operative to change the frequency channel of one television signal from a selectable first channel to a selectable second channel.

7. The videoconferencing network defined in claim 6, wherein said RF bridge further includes a processor for controlling said plurality of switches to select said first and second channels.

8. The videoconferencing network defined in claim 1, wherein said B-LAN is divided into a plurality of work groups, with each work group having assigned thereto a plurality of private channels for exclusive use within the work group plus at least one bridge output frequency channel and at least one bridge input frequency channel, the network further comprising an RF bridge, connecting the B-LAN of one group with the B-LAN of another work group, for passing only television signals on the bridge output channels from a given work group and passing only television signals on the bridge input channels to said given work group.

9. The videoconferencing network defined in claim 8, wherein said RF bridge further comprises two frequency bandpass filters connected in parallel, one bandpass filter operative to pass the frequency range of the bridge output channels and the other bandpass filter operative to pass the frequency range of the bridge input channels.

* * * * *